(12) United States Patent
Park

(10) Patent No.: US 12,231,210 B2
(45) Date of Patent: Feb. 18, 2025

(54) METHOD AND APPARATUS FOR DETECTING WEAK SIGNALS

(71) Applicant: ELECTRONICS AND TELECOMMUNICATIONS RESEARCH INSTITUTE, Daejeon (KR)

(72) Inventor: Gwang Moon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 133 days.

(21) Appl. No.: 18/319,125

(22) Filed: May 17, 2023

(65) Prior Publication Data

US 2024/0113764 A1    Apr. 4, 2024

(30) Foreign Application Priority Data

Sep. 29, 2022  (KR) .................. 10-2022-0123931
Apr. 3, 2023   (KR) .................. 10-2023-0043373

(51) Int. Cl.
*H04B 7/08*   (2006.01)
*H04B 17/20*  (2015.01)
*H04B 17/23*  (2015.01)

(52) U.S. Cl.
CPC ........... *H04B 7/0854* (2013.01); *H04B 17/23* (2015.01); *H04B 17/25* (2023.05)

(58) Field of Classification Search
CPC ....... H04B 7/0854; H04B 17/23; H04B 17/25
See application file for complete search history.

(56) References Cited

U.S. PATENT DOCUMENTS

| | | |
|---|---|---|
| 8,576,231 B2 | 11/2013 | Woodings et al. |
| 8,639,470 B2 | 1/2014 | Park et al. |
| 8,805,644 B2 | 8/2014 | Park et al. |
| 9,577,798 B1 | 2/2017 | Melis et al. |
| 9,825,794 B2 | 11/2017 | Nguyen |
| 9,857,476 B2 * | 1/2018 | Mathews .............. G01S 19/215 |
| 10,161,975 B2 | 12/2018 | Wyatt |
| 10,198,835 B2 | 2/2019 | Bernard et al. |
| 10,735,109 B1 | 8/2020 | Lapierre et al. |
| 2005/0057253 A1 | 3/2005 | Gee et al. |

(Continued)

FOREIGN PATENT DOCUMENTS

KR    20110046956 A    5/2011

OTHER PUBLICATIONS

Huijian Li et al., "Weak signal detection using multiscale morphology in microseismic monitoring", Journal of Applied Geophysics 133 (2016) 39-49.

(Continued)

*Primary Examiner* — Dac V Ha
(74) *Attorney, Agent, or Firm* — Rabin & Berdo, P.C.

(57) ABSTRACT

A weak signal detection device for detecting a weak signal appearing intermittently with a level that is less than or equal to internal noise of a radio frequency (RF) receiving part may comprise: a cross-correlation spectrum processing part configured to generate a cross-correlation spectrum using a correlation between RF receiving channels; and a waveform combiner configured to generate an output spectrum having a spectrum persistent function by assigning weight values to a current waveform and a previous waveform of the cross-correlation spectrum.

24 Claims, 14 Drawing Sheets

(56) References Cited

U.S. PATENT DOCUMENTS

2010/0075704 A1\* 3/2010 McHenry .............. H04W 16/14
455/67.11
2018/0176056 A1\* 6/2018 Atungsiri ............ H04L 27/3488
2022/0113340 A1 4/2022 Kacenjar et al.

OTHER PUBLICATIONS

Jochen Bredemeyer et al., "Improvement of Weak Signal Detection for ADS-B over Satellite", Published Apr. 7, 2016, Engineering, Physics.

Tian Tian et al., "Weak Signal Detection and Application in Electronic Experiment Based on Virtual Instrument", Applied Mechanics and Materials vols. 511-512 (2014) pp. 294-300, (2014) Trans Tech Publications, Switzerland.

Wei Gi Ho et al., "A cross-correlation based signal detector with two-step down-converter robust to finite image rejection", published in International Symposium on May 15, 2011. Computer Science, Engineering.

\* cited by examiner

METHOD AND APPARATUS FOR DETECTING WEAK SIGNALS

CROSS-REFERENCE TO RELATED APPLICATIONS

This application claims priority to Korean Patent Applications No. 10-2022-0123931, filed on Sep. 29, 2022, and No. 10-2023-0043373, filed on Apr. 3, 2023, with the Korean Intellectual Property Office (KIPO), the entire contents of which are hereby incorporated by reference.

BACKGROUND

1. Technical Field

Exemplary embodiments of the present invention relate to a weak signal monitoring technology, and more specifically, to a method and apparatus capable of detecting an extreme signal that is difficult to detect in a radio frequency (RF) signal or a weak signal that intermittently appears.

2. Related Art

Since radio waves are present everywhere at all times, various interference problems occur between devices using radio waves. Devices such as mobile phones operating in licensed frequency bands should be manufactured so as not to cause interference by leaking radio frequency (RF) levels to adjacent frequencies. However, it is not easy for general communication devices, which have various transmission modes and are simultaneously present on several networks, to satisfy all conditions.

Communication devices operating in unlicensed frequency bands should operate normally even in a state in which interference signals are present, and it is necessary for the communication devices to transmit only for a short time with low power in order to reduce mutual interference with other communication devices.

Among the above-described communication devices, digital RF devices, which are combinations of RF devices and digital devices, include a mobile phone for mobile communication, a wireless local area network (LAN) device, a digital multimedia broadcasting (DMB) device, and an RF identification (RFID) device.

Advances in software defined radio (SDR) and cognitive radio (CR) technologies minimize mutual interference between digital RF devices to support the efficient use of the radio spectrum, which is a scarce resource. Recently, due to the development of technologies related to digital RF devices such as SDR and CR, the digital RF devices can efficiently use the radio spectrum even in a complex and diverse radio wave environment.

Meanwhile, measurement equipment for monitoring RF services in order to maintain the use environment of digital RF devices can be used to find locations of interference sources and remove the interference sources by reliably detecting and analyzing RF signals having characteristics such as low power and a short signal duration time. However, due to complex changes in the radio wave environment, it is difficult to detect radio wave signals in which weak signals appear intermittently using the existing detection techniques.

For example, with the advent of various new radio wave services, many low-power wireless devices which transmit signals with low power for a short period of time are appearing in order to reduce mutual interference. The low-power wireless devices include various low-power wireless stations using a LAN, a body area network (BAN), a personal area network (PAN), and communication between devices. However, it is difficult to detect weak signals below internal noise levels of an RF receiving part in a digital RF device using a spectrogram or a cumulative spectrum of the existing technology with respect to signals of the low-power wireless devices.

That is, the existing spectrum analyzer for signal detection cannot detect a weak signal appearing intermittently with a low level near a noise level (noise floor) of the RF receiving part. In addition, the existing spectrum analyzer cannot observe relatively low-level signals which are present within relatively high-level broadband signals.

Meanwhile, some conventional technologies are able to detect intermittent appearing signals by accumulating and displaying data to process real-time large-capacity data through cumulative spectrum application, but cannot easily detect weak signals. In addition, it is possible to improve a signal-to-noise ratio on a spectrum by removing random noise components through a cross-spectrum. However, it is still difficult to detect an intermittent weak signal.

As described above, new measures capable of effectively detecting weak signals appearing intermittently with a level below the internal noise level of the RF receiving part are required.

SUMMARY

Accordingly, exemplary embodiments of the present invention are provided to substantially obviate one or more problems due to limitations and disadvantages of the related art. Exemplary embodiments of the present invention provide a weak signal detection device with a new structure, which can overcome a limitation of not being able to detect intermittent weak signals due to a relatively low signal-to-noise ratio of an input spectrum in digital radio frequency (RF) devices and spectrum analyzers.

Exemplary embodiments of the present invention also provide a method and apparatus for detecting weak signals, which can visually or intuitively detect a weak signal having a level below an internal noise level of an RF receiving part and that appears intermittently by generating a cross-correlation spectrum using a cross-correlation between RF receiving channels connected to an antenna, combining a current waveform and a previous waveform of the cross-correlation spectrum using a weight value, and accumulating the combined waveform in a waveform map image (WMI) memory.

According to a first exemplary embodiment of the present disclosure, a weak signal detection device for detecting a weak signal appearing intermittently with a level that is less than or equal to internal noise of a radio frequency (RF) receiving part may comprise: a cross-correlation spectrum processing part configured to generate a cross-correlation spectrum using a correlation between RF receiving channels; and a waveform combiner configured to generate an output spectrum having a spectrum persistent function by assigning weight values to a current waveform and a previous waveform of the cross-correlation spectrum.

The waveform combiner may generate the output spectrum by multiplying a cross-correlation spectrum at an $n^{th}$ time, which is the current waveform, by a first weight value (w1), multiplying a cross-correlation spectrum at an $(n-1)^{th}$ time, which is a waveform immediately previous to the current waveform, by a second weight value (w2), and adding the cross-correlation spectrum multiplied by the first weight value and the cross-correlation spectrum multiplied by the second weight value.

The waveform combiner may be provided with a waveform storage unit which stores the cross-correlation spectrum at the $(n-1)^{th}$ time.

The weak signal detection device may further comprise a waveform pixel mapping unit configured to map waveforms of the output spectrum to pixels of a pixel memory buffer.

The weak signal detection device may further comprise a waveform map image (WMI) memory which is provided with pixels of a pixel memory buffer and in which the waveforms of the output spectrum for a certain period of time are accumulated and stored, wherein digital level data formed by the waveforms of the output spectrum accumulated and stored in the WMI memory is transmitted to a display device at every screen refresh time of the display device.

The weak signal detection device may further comprise a controller configured to control an operation of the display device to display the digital level data in different colors on a screen of the display device according to a level of the digital level data of each pixel accumulated according to the number of times storage is performed or the number of hits of the waveforms of the cross-correlation spectrum stored in each pixel of the WMI memory.

The weak signal detection device may further comprise at least two RF receiving channels connected to at least one antenna and configured to provide a complex number signal to the cross-correlation spectrum processing part.

The weak signal detection device may further comprise, when the RF receiving channels are provided as three or more RF receiving channels, a channel selector disposed between the three or more RF receiving channels and the cross-correlation spectrum processing part.

The at least one antenna may include at least two antennas; and the at least two antennas may be connected to the at least two RF receiving channels.

The at least one antenna may include a single antenna; and the weak signal detection device may further include a power distributor disposed between the single antenna and the at least two RF receiving channels and configured to branch a received signal of the single antenna and distribute the branched signals to the at least two RF receiving channels.

Each of the at least two RF receiving channels may include an RF down conversion part; the RF down conversion part may be provided with a sweep generator connected to a local oscillator of the RF down conversion part; and the sweep generator may operate to automatically vary an oscillation frequency of the local oscillator over time.

Each of the at least two RF receiving channels may include a digital processing part; and the digital processing part may convert an analog signal of an intermediate frequency input from the RF down conversion part into a digital signal, may convert the converted digital signal into a baseband signal, and may reduce a data sampling rate of the baseband signal to generate complex number data input to the cross-correlation spectrum processing part.

According to a second exemplary embodiment of the present disclosure, a method of detecting a weak signal appearing intermittently with a level that is less than or equal to an internal noise of a radio frequency (RF) receiving part may comprise: generating a cross-correlation spectrum using a correlation between RF receiving channels; and generating an output spectrum having a spectrum persistent function by assigning weight values to a current waveform and a previous waveform of the cross-correlation spectrum.

The generating of the output spectrum may include generating the output spectrum by multiplying a cross-correlation spectrum at an $n^{th}$ time, which is the current waveform, by a first weight value, multiplying a cross-correlation spectrum at an $(n-1)^{th}$ time, which is a waveform immediately previous to the current waveform, by a second weight value, and adding the cross-correlation spectrum multiplied by the first weight value and the cross-correlation spectrum multiplied by the second weight value.

The method may further comprise: storing a cross-correlation spectrum at the $(n-1)^{th}$ time.

The method may further comprise: mapping waveforms of the output spectrum to pixels of a waveform map image (WMI) memory.

The method may further comprise: accumulating and storing the waveforms of the output spectrum in the WMI memory for a certain period of time.

The method may further comprise: transmitting digital level data, which is formed by the waveforms of the output spectrum accumulated and stored in the WMI memory, to a display device at every screen refresh time of the display device.

The method may further comprise: controlling an operation of the display device to display the digital level data in different colors on a screen of the display device according to a level of the digital level data of each pixel accumulated according to the number of times storage is performed or the number of hits of the waveforms of the cross-correlation spectrum stored in each pixel of the WMI memory.

The method may further comprise: providing a complex number signal to a cross-correlation spectrum processing part through at least two RF receiving channels connected to at least one antenna.

The method may further comprise, when the RF receiving channels are provided as three or more RF receiving channels, selecting two channels between the three or more RF receiving channels and the cross-correlation spectrum processing part on the basis of a cross-correlation value.

The at least one antenna may include a single antenna; and the method may further include branching a received signal of the single antenna and distributing the branched signals to the at least two RF receiving channels through a power distributor disposed between the single antenna and the at least two RF receiving channels.

The method may further comprise, when each of the at least two RF receiving channels is provided with an RF down conversion part, and the RF down conversion part is provided with a sweep generator connected to a local oscillator of the RF down conversion part, automatically varying, by the sweep generator, an oscillation frequency of the local oscillator over time.

Each of the at least two RF reception channels may further include a digital signal processor. The digital signal processing unit may convert the analog signal of the intermediate frequency input from the RF down conversion unit into a digital signal, convert the converted digital signal into a baseband signal, and generates complex data by reducing the data sampling rate of the baseband signal. And, the generated complex number data may be transmitted to the cross-correlation spectrum processing unit.

According to the present invention, an intermittent weak signal detection device (hereinafter referred to simply as a "weak signal detection device") with a new structure and a new operating method, which are capable of overcoming a limitation in a conventional spectrum analyzer of not being able to detect a weak signal having a relatively low signal-to-noise ratio of an input spectrum, that is, a weak signal having a level that is smaller than an internal noise level during normal operation, can be provided.

In addition, when the weak signal detection device of the present invention is used, a cross-spectrum of the weak signal, which is received from an antenna and is present at a level that is less than or equal to an internal noise of an RF receiving part, is generated through cross-correlation signal processing between two RF receiving channels, and the cross-spectrum is accumulated and displayed in real-time so that the weak signal appearing intermittently in a wireless signal, which could not be observed in the related art, can be effectively detected.

In addition, according to the present invention, it is possible to detect a phenomenon that is difficult to capture a radio signal by measuring and analyzing a spectrum after storing the spectrum in a memory in real time to overcome a limitation of a display device. In particular, it is possible to effectively detect a low-level signal near a noise level (noise floor) appearing intermittently or to observe a low-level signal present within a high-level wideband signal.

In addition, when the weak signal detection method or the weak signal detection device of the present invention is applied to a signal detection system, system performance can be dramatically improved in terms of sensitivity. That is, by effectively detecting a weak signal appearing intermittently, it can be effectively used in fields such as national radio wave management, maritime and air safety radio wave monitoring, and electronic warfare in national defense.

DETAILED DESCRIPTION OF THE EMBODIMENTS

Figure 1:
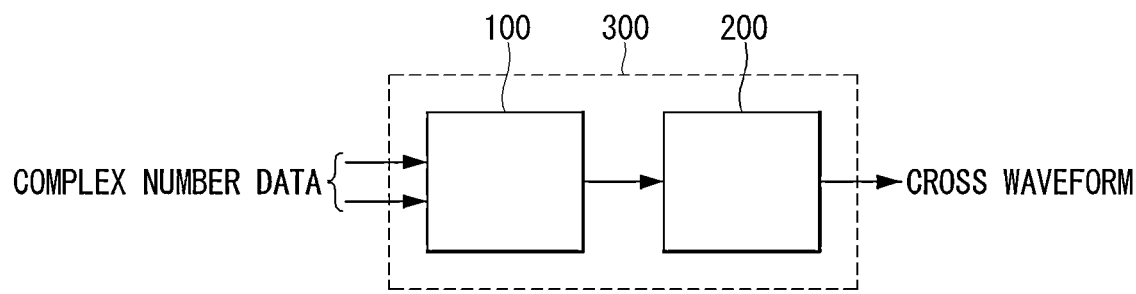
FIG. 1 is a block diagram for describing a main configuration of a weak signal detection device according to a first embodiment of the present invention.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the description of the following embodiments, a spectrum analyzer measures an amplitude of an input signal versus a frequency within an entire frequency range to be analyzed by equipment. The main use of the spectrum analyzer is to measure spectral intensities of known and unknown signals.

The spectrum analyzer may have the form of a measuring instrument in which a display device for displaying a distribution of frequency spectrum components and a superheterodyne receiver are combined. In addition, the spectrum analyzer may have a sweep oscillator as a local generator and sequentially receive a frequency spectrum of an input signal in response to a frequency change of the sweep oscillator, and an output of the spectrum analyzer may have a form in which a sweep repetition signal sweeping the sweep oscillator on a vertical axis of the display device is applied to a horizontal axis. In addition, the spectrum analyzer is a type of instrument for analyzing an RF signal transmitted from a reader or a tag or an RF signal received through an antenna and may have a function of analyzing a frequency domain signal into a time domain signal through a vector signal analyzer (VSA).

"Electromagnetic waves" or "spectrum" includes all frequencies of infrared rays, visible rays, ultraviolet rays, X-rays, and gamma rays in addition to the RF spectrum. Among all the frequencies, the RF spectrum may be radio waves in the frequency range of 3 THz or less. In addition, in the present specification, the RF spectrum may be referred to as a frequency spectrum.

An RF channel is a communication line established between a mobile station and a base station in mobile communication. An RF channel enabling simultaneous communication or data transmission/reception between mobile terminals or between a mobile terminal and a fixed terminal has a limited number of channels within an allocated frequency band. The RF receiving channel may be the RF channel in a specific state or a specific communication line for receiving signals or data.

A cross correlation may be expressed as $R_{12}(t)$ when two random signals $X_1(t)$ and $X_2(t)$ are defined as in the following Equation 1. In Equation 1, $X_1(t)$ denotes a random input of a linear stationary system, and when $X_2(t)$ is a response of $X_1(t)$, $R_{12}(t)$ may be an inverse Laplace transform of a transfer function of this system. In the present specification, a cross-spectrum may be obtained through cross-correlation signal processing of complex digital data.

Complex number data is a signal component having predetermined periodicity and may be what is converted into a baseband complex number signal by reducing a sampling rate of a digital signal converted from an analog signal in a digital processing part connected to an RF down conversion part. The complex number data may have a predetermined level in a preset frequency band. The complex number data may be referred to as a complex number signal or complex digital data.

A frequency span represents a frequency range or frequency width to be measured by a measuring instrument or a spectrum analyzer and may be referred to as a swept frequency bandwidth or simply referred to as a span. A center frequency in the frequency band to be analyzed may be the center of the frequency span.

Digital level data is data having a level in a digital form instead of an analog form. In the present specification, the digital level data may be data accumulated and stored in a waveform map image (WMI) memory by mapping cross-spectrum waveforms, which are obtained by multiplying and summing a current waveform subjected to cross-correlation signal processing and a previous waveform subjected to cross-correlation signal processing by weight values, to predetermined screen pixels of a display device according to a frequency and a level over the frequency span. The digital level data is cumulative spectrum waveforms and may be displayed on a screen of a non-display device in different colors or brightness preset according to the number of accumulations.

A weak signal is a low-level signal which is near or below a noise level (noise floor) of the RF receiving part. That is, the weak signal may be a signal transmitted with relatively low power for a short period of time in order to reduce mutual interference between communication devices such as low-power wireless devices in various new radio wave service environments. In addition, the weak signal may be a signal having a level that is lower than or equal to an internal noise level of the RF receiving part in a digital RF device in the existing spectrogram or cumulative spectrum. The internal noise level of the RF receiving part may range from several tens of decibels (dB) to several dB.

Hereinafter, exemplary embodiments of the present invention will be described in detail with reference to the accompanying drawings. The following detailed description is provided for illustrative purposes only and should not be construed as limiting the concepts of the present invention to any particular physical configuration. In order to facilitate a thorough understanding of the present invention, the same reference numerals are used for the same components in the drawings and overlapping description of the same components will be omitted.

FIG. 1 is a block diagram for describing a main configuration of a weak signal detection device according to a first embodiment of the present invention.

Referring to FIG. 1, a weak signal detection device includes a cross-correlation spectrum processing part 100 and a waveform combiner 200 in order to detect a weak signal, particularly a weak signal appearing intermittently, which is a signal with a level that is less than or equal to an internal noise level of a radio frequency (RF) receiving part of a measuring instrument such as a digital RF device or a spectrum analyzer. The cross-correlation spectrum processing part 100 may be referred to as a cross-correlation processing part for short.

The cross-correlation processing part 100 generates a cross-correlation spectrum using a cross-correlation between RF receiving channels connected to one or more $$R_{12}(t) = \int_0^t X_1(t-\tau)X_2(t)d\tau \qquad [\text{Equation 1}]$$

antennas. A cross-correlation spectrum may be referred to as cross-spectral waveforms or simply as a cross waveform. That is, the cross-correlation processing part 100 may perform cross-correlation signal processing on complex number signals from the RF receiving channels. The complex number signal may correspond to complex number data.

Here, the RF receiving channels may convert RF inputs from the antenna into intermediate frequency signals, convert the analog signal of the intermediate frequency input from the RF down conversion unit into digital signals, and convert the converted digital signals into baseband complex number signals by reducing a sampling rate of the converted digital signals.

The above-described cross-correlation processing part 100 may receive the complex number signals from two RF receiving channels. The cross-correlation processing part 100 may calculate cross-correlation values of two or more digital signals to which a Fourier transform is applied.

In this case, a signal detection controller connected to the cross-correlation processing part 100 may determine whether a correlation is present between two or more Fourier-transformed digital signals. That is, the signal detection controller may select a low-level signal having frequency components with a correlation as a weak signal and may not select a low-level signal having frequency components without correlation as noise. The signal detection controller may be simply referred to as a determiner or a controller. The determiner or the controller may correspond to a control device formed as a microprocessor, a processor, or the like.

In addition, in order to obtain a diversity effect, the cross-correlation processing part 100 may be connected to three or more RF receiving channels connected to multiple antennas. In this case, the cross-correlation processing part 100 may perform cross-correlation signal processing on complex number signals of two RF receiving channels selected in a predetermined order or randomly selected from among the three or more RF receiving channels and may perform the cross-correlation signal processing on complex number data of all the RF receiving channels or a combination pair thereof. In this case, the signal detection controller may select two RF receiving channels having relatively highest noise reduction performance or efficiency with respect to noise reduction on the basis of cross-correlation values of all the RF receiving channels or the combination pair thereof. The cross-correlation processing part 100 may generate a cross-correlation spectrum using a correlation between the two RF receiving channels selected by the signal detection controller.

The waveform combiner 200 may receive the cross-correlation spectrum from the cross-correlation processing part 100 and generate an output spectrum by multiplying a current waveform and a previous waveform of the cross-correlation spectrum by weight values over the frequency span and adding the weighted current waveform and the weighted previous waveform. The output spectrum is cross-correlation spectrum waveforms, and the cross-correlation spectrum waveforms may be simply referred to as cross waveforms.

Here, when the previous waveform is a waveform of a first time point, the current waveform may be a waveform of a second time point that is later than the first time point. The previous waveform may be a single initial waveform or a combination of a first previous waveform and a second previous waveform with weight values. Multiplying the current waveform and the previous waveform by the weight values and adding the weighted current waveform and the weighted previous waveform may be expressed as a combination of the current waveform and the previous waveform and may include normalizing the current waveform based on a level of the previous waveform in order to combine the current waveform with the previous waveform in an accumulative manner.

The weight values given to the current waveform and the previous waveform may be the same as or different from each other. Each weight may have a value selected from the range of 0 to 1.0.

The cross-correlation processing part 100 and the waveform combiner 200 may be formed as independent modules, but the present invention is not limited thereto, and the cross-correlation processing part 100 and the waveform combiner 200 may be formed as a cross-correlation waveform generator 300 in the form of a single module.

According to the present embodiment, cross-correlation spectrum waveforms obtained by combining past and current waveforms with weight values may be mapped to screen pixels of a display device and accumulated and stored in corresponding pixels of a WMI memory. In addition, each pixel in which waveforms are accumulated and stored in the WMI memory may have a cumulative level according to the number of waveforms accumulated for each pixel or the number of hits of the waveforms for each pixel and may store data of each pixel configured to indicate a preset color and/or brightness according to the cumulative level, that is, digital level data. The digital level data may be transmitted from the WMI memory to a driver of the display device at every screen refresh time of the display device. According to the above configuration, a user may intuitively detect an intermittent weak signal on the screen of the display device.

In the present embodiment, the weak signal may represent a signal having a low level that is less than or equal to the internal noise level of the RF receiving part of the signal detection device such as a digital RF device or a spectrum analyzer. In terms of the signal detection device such as the spectrum analyzer, the intermittent weak signal may be a low-level signal which intermittently appears in the form of not using a specific frequency within a frequency band to be detected while infrequently or occasionally using the specific frequency for a predetermined unit time.

Figure 2:
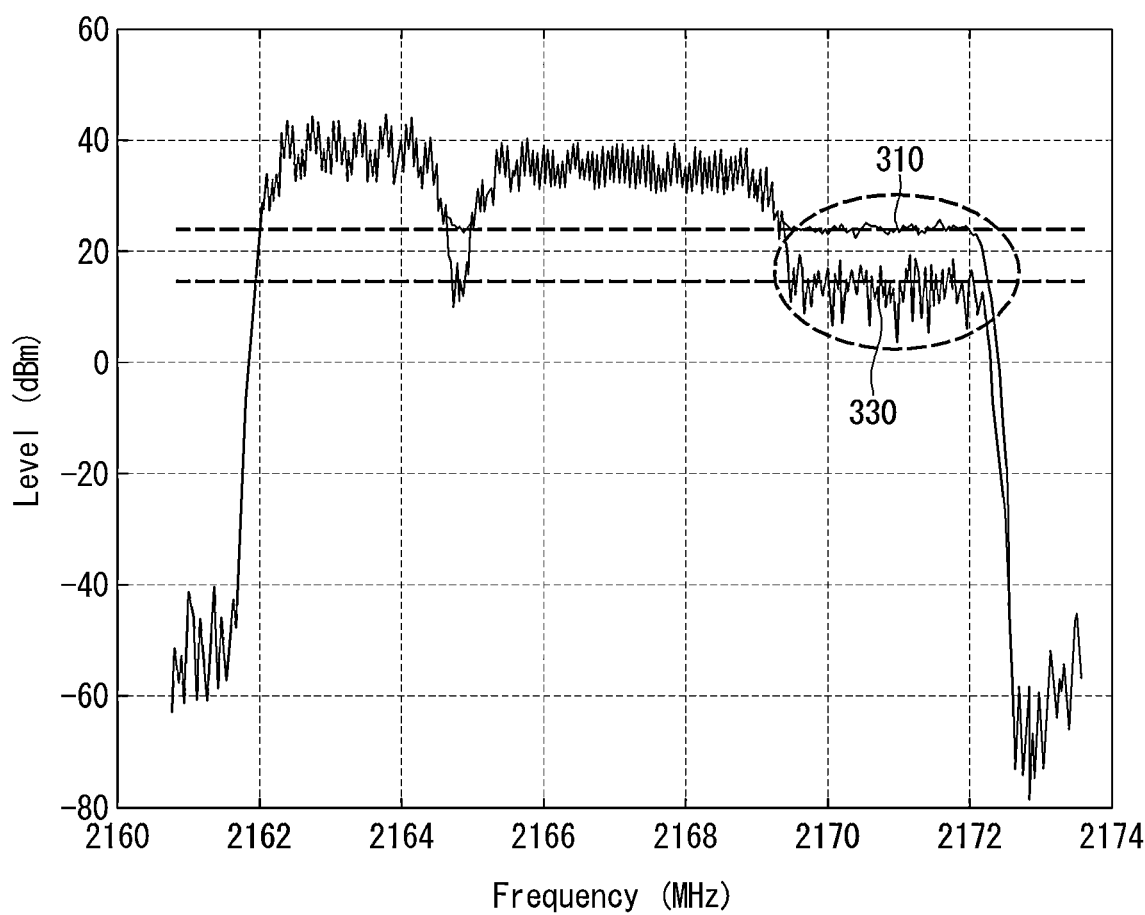
FIG. 2 is an exemplary view illustrating a noise level according to cross-correlation signal processing applicable to the weak signal detection device of FIG. 1.

FIG. 2 is an exemplary view illustrating a noise level according to cross-correlation signal processing applicable to the weak signal detection device of FIG. 1.

Referring to FIG. 2, a result of simulating a Wideband Code Division Multiple Access (WCDMA) signal having a center frequency of 2167.2 MHz with a reception bandwidth of 10 MHz, a sampling frequency of 12.8 MHz, a sampling number of 65,400, a cross-correlation number of 128, and a fast Fourier transform number of 1,024 can be confirmed. In FIG. 2, reference numeral 310 represents an average value of a frequency spectrum, and reference numeral 330 represents a cross-correlation processed frequency spectrum.

Looking at a portion indicated by two dotted lines in the simulation result, it can be confirmed that the noise level was reduced as much as about 10 dB when the complex number data corresponding to the frequency spectrum was subjected to the cross-correlation signal processing.

As described above, when the cross-correlation value is used, since the noise level of the frequency spectrum is reduced and thus a signal-to-noise ratio is increased, it is possible to detect a weak signal having a level that is lower than an original internal noise level of the RF receiving part. When the cross-correlation number increases, the noise level may be further reduced.

Figure 3:
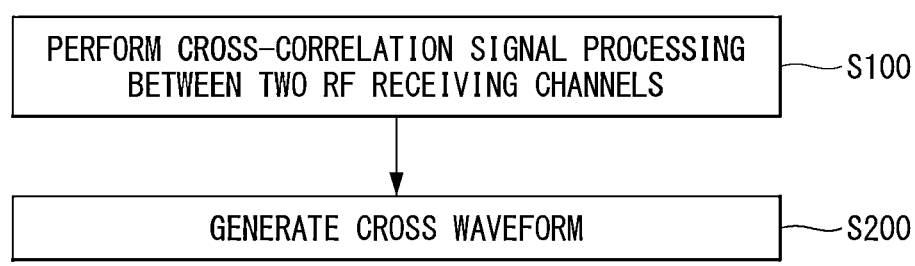
FIG. 3 is a flowchart for describing a main operation of the weak signal detection device of FIG. 1.

FIG. 3 is a flowchart for describing a main operation of the weak signal detection device of FIG. 1.

Referring to FIG. 3, the weak signal detection device performs cross-correlation signal processing between two RF receiving channels in order to detect a weak signal appearing intermittently in a radio signal (S100), and generates a cross waveform combining a current waveform and a previous waveform of a cross-correlation spectrum generated by the cross-correlation signal processing and applying a persistent function to the cross-correlation spectrum (S200).

Specifically, in the performance of the cross-correlation signal processing (S100), a cross-correlation processing part may generate a cross-correlation spectrum by performing the cross-correlation signal processing on complex digital data received from two RF receiving channels.

In the generation of the cross waveform (S200), a waveform combiner may generate an output spectrum by multiplying a current waveform and a previous waveform of the cross-correlation spectrum, which are output from the cross-correlation processing part, by weight values and then adding the weighted current waveform and the weighted previous waveform. The output spectrum may be referred to as a cross waveform, and the cross waveform may include a cross-correlation spectrum waveform.

According to the configuration of the present embodiment, the output spectrum may be generated by combining the current waveform and the previous waveform of the cross-correlation spectrum, of which a noise level is reduced, with the weights, the generated output spectrum may be accumulated and stored in the WMI memory through mapping between waveforms and pixels, and an intermittent weak signal may be visually displayed on the screen of the display device using digital level data accumulated and stored in cells of the WMI memory corresponding to screen pixels of the display device.

Figure 4:
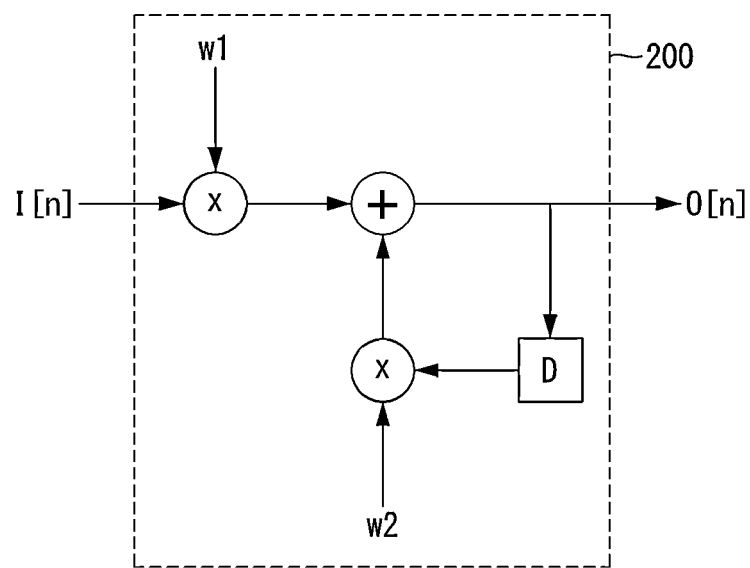
FIG. 4 is a diagram for describing an operating principle of the waveform combiner of the weak signal detection device of FIG. 1.

FIG. 4 is a diagram for describing an operating principle of the waveform combiner of the weak signal detection device of FIG. 1.

Referring to FIG. 4, in order to apply a persistent function to the cross-correlation spectrum, the waveform combiner 200 may include a first multiplier, a second multiplier, an adder, and a waveform storage unit D.

The waveform combiner 200 may multiply an input spectrum I[n], which is the current waveform of the cross-correlation spectrum, at an $n^{th}$ by a first weight value w1 using the first multiplier. The first weight value w1 may be a value selected from the range of 0 or more to 1.0.

In addition, an output spectrum O[n] of the waveform combiner 200 may be stored in the waveform storage unit D. Meanwhile, an output spectrum O[n−1] pre-stored in the waveform storage unit D may be transmitted as a previous waveform to the second multiplier when the input spectrum I[n] is input to the waveform combiner 200.

In addition, the waveform combiner 200 may multiply the previous waveform, which is the output spectrum O[n−1] input from the waveform storage unit D at an $(n-1)^{th}$ time, by a second weight value w2 using the second multiplier. The second weight value w2 may be a value selected from the range of 0 to 1.0.

In addition, the waveform combiner 200 may generate the output spectrum O[n] having a spectrum persistent function by adding the current waveform of the cross-correlation spectrum multiplied by the first weight value w1 and the previous waveform of the cross-correlation spectrum multiplied by the second weight value w2 using the adder.

The output spectrum of the current waveform may be stored in the waveform storage unit D again and used when the persistent function is applied to an input spectrum, which is a next waveform, at the $(n+1)^{th}$ time. Here, n may be an arbitrary natural number.

Figure 5:
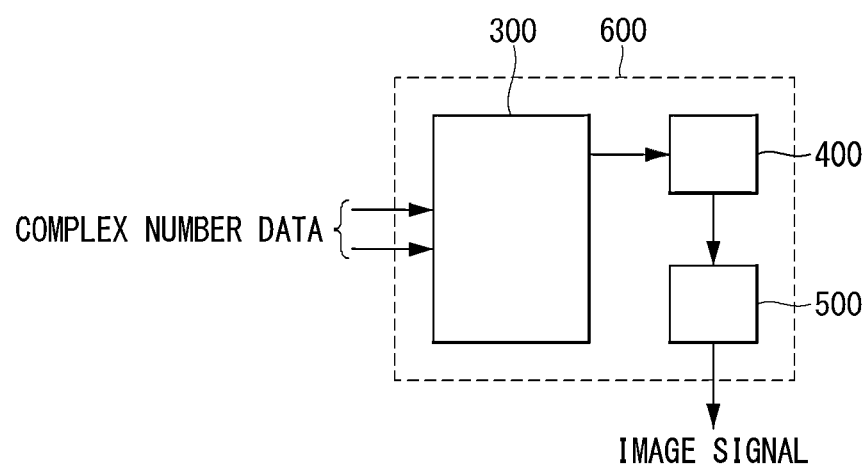
FIG. 5 is a schematic block diagram illustrating a weak signal detection device according to a second embodiment of the present invention.

FIG. 5 is a schematic block diagram illustrating a weak signal detection device according to a second embodiment of the present invention.

Referring to FIG. 5, the weak signal detection device may include a cross-correlation waveform generator 300, a waveform pixel mapping unit 400, and a WMI memory 500.

A combination of the cross-correlation waveform generator 300, the waveform pixel mapping unit 400, and the WMI memory 500 may be referred to as a spectrum processing part 600. The spectrum processing part 600 may include a component for mapping a cross-correlation spectrum to screen pixels of a display device and cumulatively storing the cross-correlation spectrum having a persistent function in the WMI memory 500.

Specifically, to describe components of the spectrum processing part 600, the cross-correlation waveform generator 300 may include the cross-correlation processing part and the waveform combiner which have been previously described with reference to FIG. 1. The cross-correlation waveform generator 300 may generate and output a cross waveform. The cross waveform is a cross-correlation spectrum having a spectrum persistent function, corresponds to a cross-correlation spectrum waveform, and may be referred to as a cross-spectrum waveform.

The waveform pixel mapping unit 400 may map the cross waveform input from the cross-correlation waveform generator 300, that is, the cross-correlation spectrum waveform, to pixels constituting a preset screen of the display device. The cross waveform mapped by the waveform pixel mapping unit 400 may be accumulated and stored in the WMI memory 500.

The WMI memory 500 may accumulate and store cross waveforms mapped by the waveform pixel mapping unit 400 in memory cells corresponding to the pixels of the display device. The memory cell may be simply referred to as a cell. That is, the cross waveforms each having the spectrum persistent function and mapped to the pixels may be stored in corresponding cells as levels increase with the number of accumulations. A level of digital data stored in each cell of the WMI memory 500 increases according to the accumulation or storage number, and the digital data may be set to have different colors or brightness on the screen of the display device according to the level. The digital data may be referred to as a cumulative spectrum or digital level data. The WMI memory 500 may include a memory buffer, a pixel memory buffer, or an image memory buffer, and the image memory buffer may include a raster image memory buffer.

In addition, in the WMI memory 500, a plurality of cells corresponding to a data frame may be set to correspond to a plurality of pixels of a two-dimensional (2D) screen of the display device. In the virtual 2D screen formed of the plurality of pixels, an x-axis may correspond to a frequency of the cross wave, and a y-axis may correspond to a level of the cross wave. In addition, an x-axis of the memory buffer may correspond to a horizontal axis of a display window, and a y-axis thereof may correspond to a vertical axis of the display window.

In addition, the WMI memory 500 may be formed as the memory buffer to allocate different colors to each cell corresponding to the pixel of the display device according to the level of the digital level data currently stored and output a cumulative spectrum allocated to different colors as an image signal of the display device.

That is, in the weak signal detection device, the digital level data stored in the WMI memory 500 may be transmitted to the display device as frame data or an image signal at every screen refresh time of the display device.

In the present embodiment, the digital level data may be data whose digital level varies according to the number of accumulations for each cell of the WMI memory 500. For the digital level data, each pixel may have a preset initial level (e.g., 0, −100, and the like).

As described above, according to the present embodiment, the complex number signal is subjected to the cross-correlation signal processing, the current waveform and the previous waveform of the signal-processed cross-correlation spectrum are multiplied by weight values and then added, the added waveform is mapped to the screen pixels of the display device and accumulated and stored in the WMI memory, the digital level data accumulated in each cell is transmitted to the display device at every screen refresh time of the display device, and corresponding pixels on the screen of the display device are expressed in colors and/or brightness according to the level of the digital level data corresponding to each cell. Thus, extreme signals or intermittent weak signals can be visually/intuitively detected.

Figure 6:
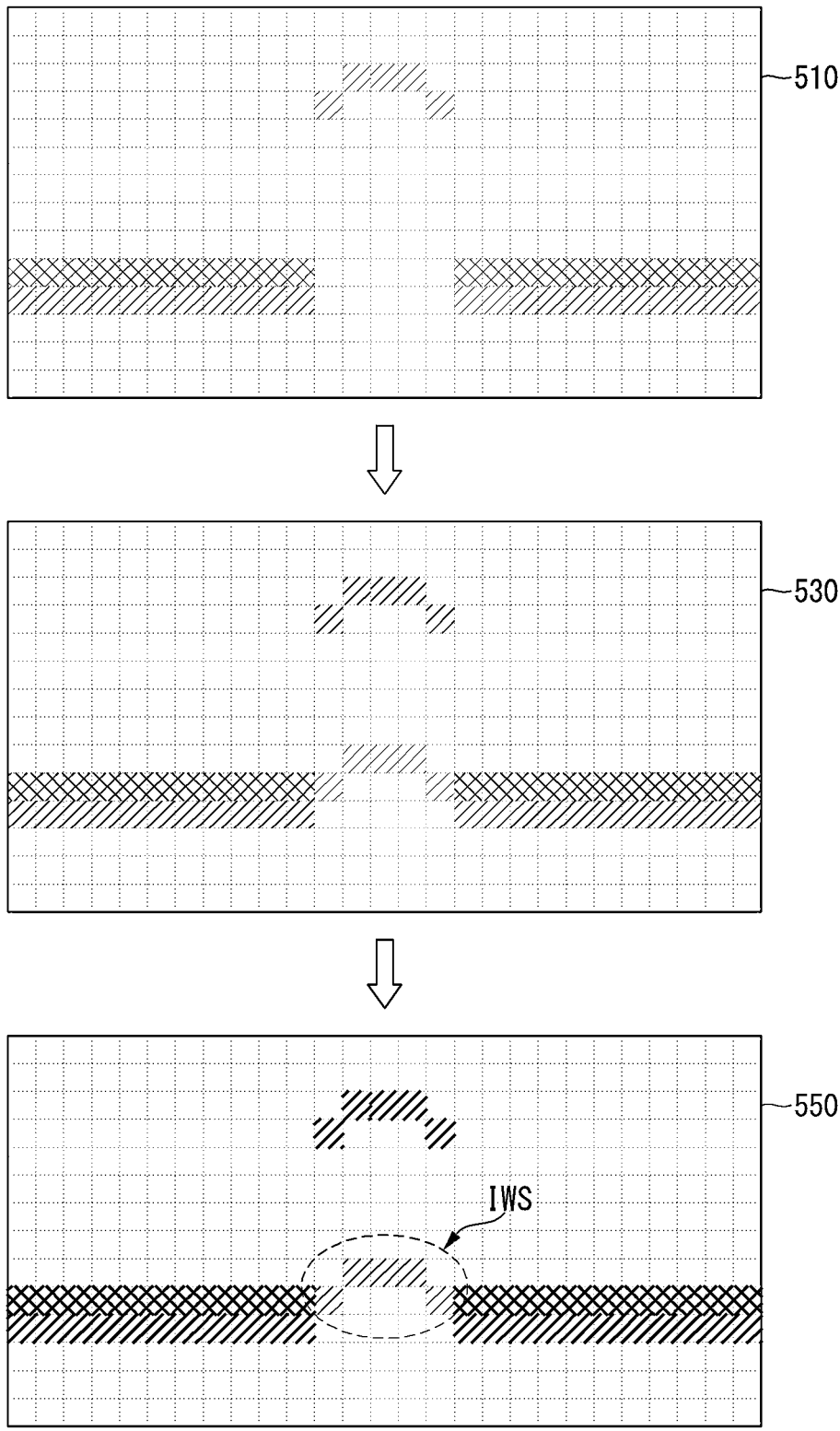
FIG. 6 is a flowchart for describing the digital level data used in the weak signal detection device of FIG. 5.

FIG. 6 is a flowchart for describing the digital level data used in the weak signal detection device of FIG. 5.

Referring to FIG. 6, examples of digital level data stored in a first WMI memory 510 at a first time, in a second WMI 530 at a second time, and in a third WMI memory 550 at a third time over time can be seen.

The first to third WMI memories 510, 530, and 550 may be the same single image memory buffer, except that the stored digital level data differs over time. The third time is later than the second time, and the second time is later than the first time.

Specifically, digital level data of a first cross waveform at the first time stored in cells of the first WMI memory 510 (hereinafter referred to as "first digital level data") may be stored in at least some first cells. The cross waveform corresponds to the cross-correlation spectrum waveform.

That is, due to the cross-correlation spectrum waveform stored in the first cells at the first time, the first WMI memory 510 may include cells each having a first level that is higher than an initial level only in the first cells (see a slashed portion).

In other words, each of the first cells may be considered to hit a corresponding cell with respect to corresponding sample points of the cross waveform and set to have a predetermined different color and/or brightness according to the accumulated number of hits.

When the first digital level data stored in the first WMI memory 510 is transmitted to the display device, a cumulative spectrum identical or similar to a cumulative spectrum of the first WMI memory 510 may be displayed on the screen of the display device.

In addition, digital level data (second digital level data) of a second cross waveform at the second time stored in cells of the second WMI memory 530 may be stored in some second cells. At least some of the second cells may be overwritten with at least some of the first cells. A level of the digital level data of the second cell to be overwritten may be higher than the level of the digital level data of the first cell to be overwritten by a preset size, for example, a reference size according to the number of accumulations performed at once.

In particular, for example, when an intermittent weak signal appears, digital level data on the intermittent weak signal may be recorded in some of the second cells of the second WMI memory 530.

In addition, digital level data (third digital level data) of a third cross waveform at the third time stored in cells of the third WMI memory 550 may be stored in some third cells. At least some of the third cells may be overwritten with at least some of the second cells. A level of the digital level data of the third cell to be overwritten may be higher than the level of the digital level data of the second cell to be overwritten by a preset size, for example, a reference size according to the number of accumulations performed at once.

In addition, when the intermittent weak signal is also included in the third cross waveform following the second cross waveform, the third digital level data may include level information on an intermittent weak signal (IWS) as a level which increases according to the number of times signals are accumulated.

Each of the third cells has a level according to the number of hits accumulated with respect to corresponding sample points of the cross waveform, and the level of each of the third cells may be set to be displayed in different colors and/or brightness specified in advance according to the size of the corresponding level on the screen of the display device.

In this way, the third digital level data stored in the third WMI memory 550 and including the IWS may be transmitted to the display device at the screen refresh time of the display device, and thus the cumulative spectrum in different colors and/or brightness including the IWS may be displayed on the screen of the display device according to the level of the digital level data pre-stored in the third WMI memory 550.

Figure 7:
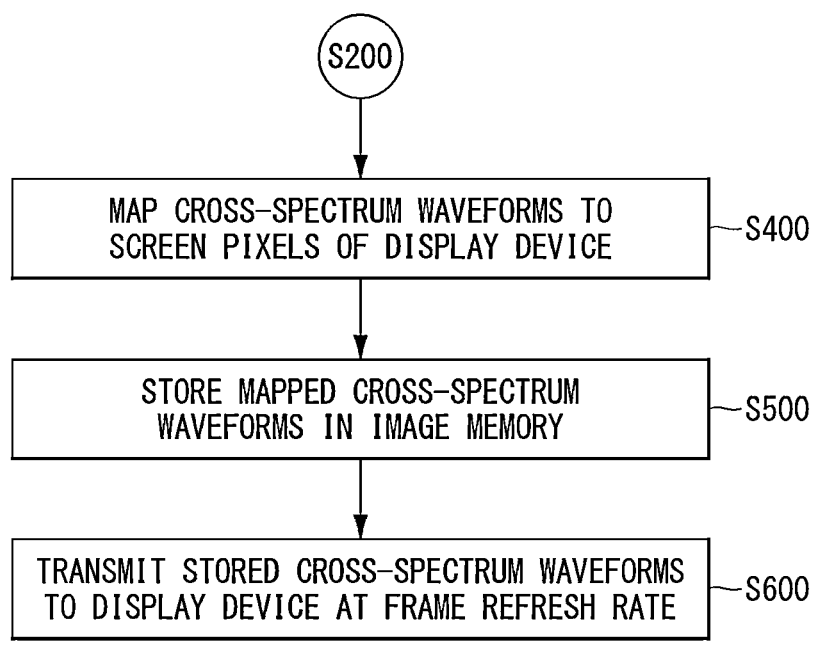
FIG. 7 is a flowchart for describing an operating principle of the weak signal detection device of FIG. 5.

FIG. 7 is a flowchart for describing an operating principle of the weak signal detection device of FIG. 5.

Referring to FIG. 7, in order to detect an IWS included in a radio signal or an RF signal, the weak signal detection device may generate a cross-correlation spectrum using a cross-correlation between two RF receiving channels, and generate a cross waveform having a spectrum persistent function by combining a current waveform and a previous waveform of the cross-correlation spectrum using weight values (S200). The cross waveform may be referred to as a cross-spectrum waveform, a cross-correlation spectrum, or a cross-correlation spectrum waveform.

In addition, the weak signal detection device may sequentially map cross-spectrum waveforms to the screen pixels of the display device overtime (S400) and accumulate and store the cross-spectrum waveforms in an image memory according to the mapping result (S500). The image memory may be referred to as a WMI memory, an image memory buffer, a memory buffer, or the like.

That is, a waveform pixel mapping unit of the weak signal detection device may map a cross waveform at a specific time to pixels forming the screen of the display device. In addition, the weak signal detection device may store the mapped cross waveform in cells of the memory buffer corresponding to the pixels forming the screen of the display device. Cross waveforms for a certain period of time may be accumulated and stored in the cells of the memory buffer.

In addition, in order to display the cross waveforms stored in the memory buffer on the screen of the display device, the weak signal detection device may transmit the cross waveforms as image signals to the data driver of the display device at every screen refresh time of the display device.

That is, the weak signal detection device may transmit the stored cross-spectrum waveforms to the display device at a frame refresh rate (S600).

According to the present embodiment, spectra are accumulated and mapped in the WMI memory with respect to wireless signals including intermittently appearing weak signals, and the frequency versus level of the mapped spectrum is displayed as waveforms of image signals in different colors on the display window according to an output frequency of the spectrum.

Figure 8:
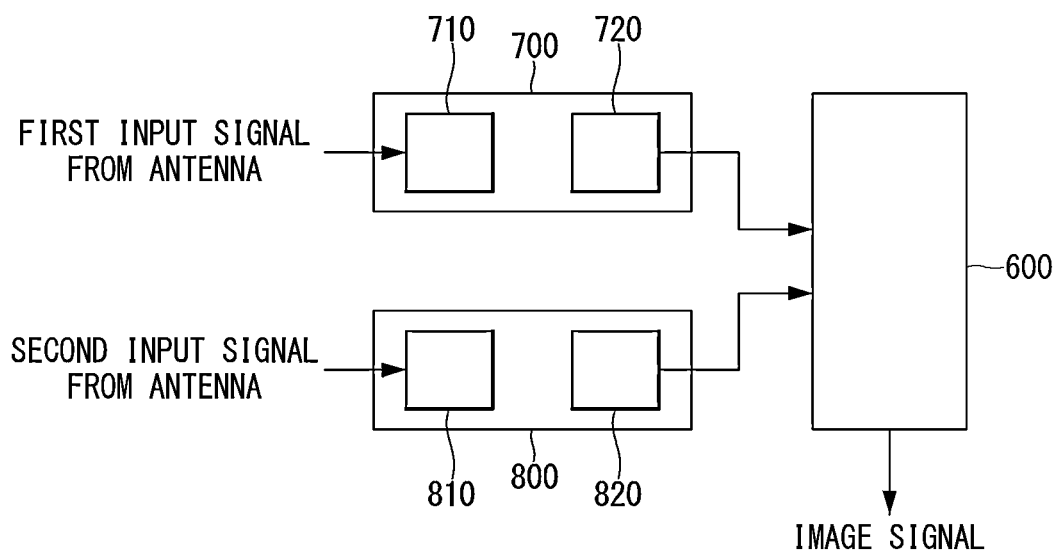
FIG. 8 is a block diagram illustrating a weak signal detection device according to a third embodiment of the present invention.

FIG. 8 is a block diagram illustrating a weak signal detection device according to a third embodiment of the present invention.

Referring to FIG. 8, the weak signal detection device may include a spectrum processing part 600, and a first RF receiving channel part 700 and a second RF receiving channel part 800 which are connected to an input terminal of the spectrum processing part 600. The first RF receiving channel part 700 and the second RF receiving channel part 800 may be simply referred to as a first RF receiving channel and a second RF receiving channel, respectively.

The spectrum processing part 600 may include the cross-correlation waveform generator 300, the waveform pixel mapping unit 400, and the waveform map image memory 500, which have been described above with reference to FIG. 5.

The first RF receiving channel 700 may include a first RF down conversion part 710 for converting a first RF input from an antenna into an intermediate frequency signal, and a first digital processing part 720 connected to the first RF down conversion part 710.

The second RF receiving channel 800 may include a second RF down conversion part 810 for converting a second RF input from the antenna into an intermediate frequency signal, and a second digital processing part 820 connected to the second RF down conversion part 810.

The first RF input and the second RF input may be signals obtained by dividing a radio signal received from a single antenna through a power distributor or radio signals received from two independent antennas.

The RF down conversion parts 710 and 810 of the RF receiving channels may each convert an RF signal received from the antenna into an intermediate frequency signal. The RF down conversion part may include a pre-selector, a local oscillator, a mixer, and a filter (see reference numeral 30 of FIG. 13).

In the above-described case, the pre-selector may pass only a signal in a specific frequency range among the RF signals received from the antenna under the control of a processor or a controller which controls the operation of the weak signal detection device and transmit the signal to the mixer. The local oscillator may supply a reference frequency to the mixer under the control of the controller. The mixer may mix the reference frequency received from the local oscillator with the RF signal received through the pre-selector to down-convert a frequency to an intermediate frequency band. In addition, the filter may perform band-pass filtering and select only a desired channel among several channels included in the intermediate frequency signal under the control of the controller.

The digital processing parts 720 and 820 of the RF receiving channel may convert analog signals converted into the intermediate frequency signals into digital signals and convert the converted digital signals into baseband complex number signals by reducing a sampling rate of the converted digital signals. Each digital processing part may include an analog-to-digital converter and a digital down converter (see reference numeral 40 of FIG. 13).

In the above-described case, the analog-to-digital converter may convert the analog signal of an intermediate frequency input from the RF down conversion part into a digital signal. In addition, the digital down converter may convert the digital signal converted in the analog-to-digital converter into a baseband signal, generate complex digital data by reducing a data sampling rate, and output the generated complex digital data to the spectrum processing part 600.

A detailed configuration of the spectrum processing part 600 is replaced with the detailed description of FIG. 5.

Figure 9:
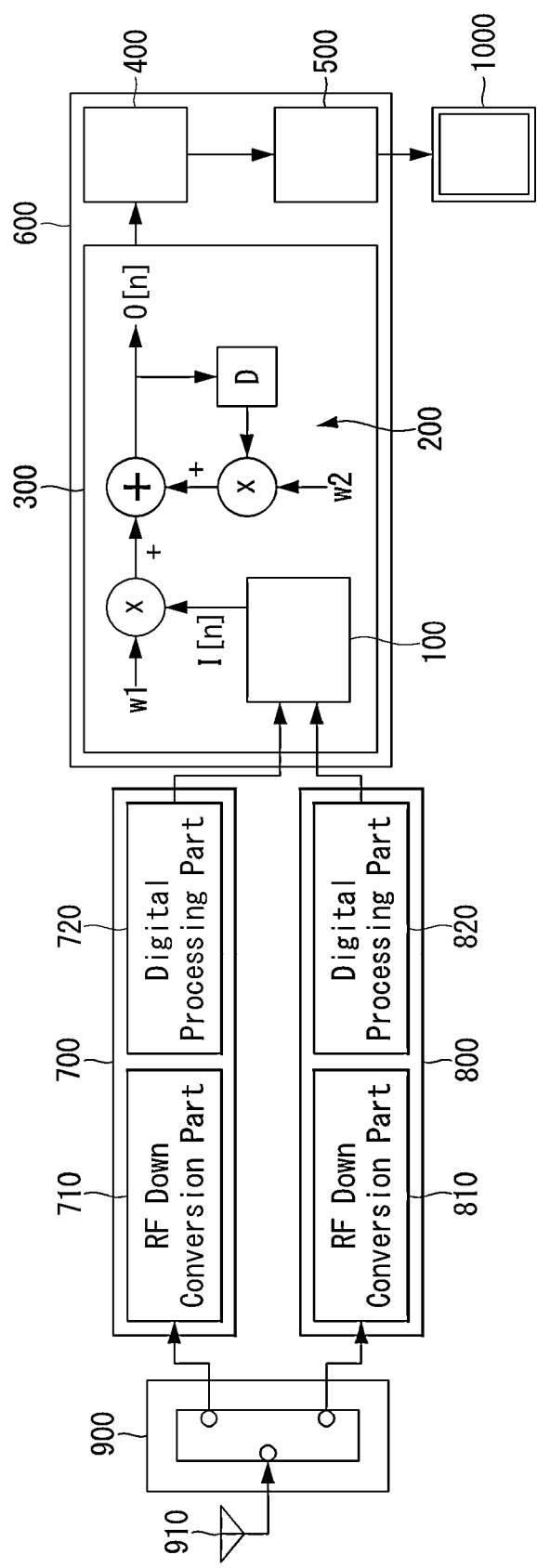
FIG. 9 is a block diagram illustrating a weak signal detection device according to a fourth embodiment of the present invention.

FIG. 9 is a block diagram illustrating a weak signal detection device according to a fourth embodiment of the present invention.

Referring to FIG. 9, the weak signal detection device may include an antenna 910, a power distributor 900, a first RF receiving channel 700, a second RF receiving channel 800, and a spectrum processing part 600. The spectrum processing part 600 may be connected to a display device.

To describe each component in more detail, the antenna 910 receives an RF signal in the air. The antenna 910 may be referred to as an antenna part, an antenna system, or the like.

The power distributor 900 distributes an RF input from the antenna 910 and supplies the distributed RF signals to the two RF receiving channels 700 and 800.

Each of the two RF receiving channels 700 and 800 converts the RF signal input from the antenna 910 into an intermediate frequency signal which is able to undergo digital signal processing. The first RF receiving channel 700 may include a first RF down conversion part 710 and a first digital processing part 720. Similarly, the second RF receiving channel 800 may include a second RF down conversion part 810 and a second digital processing part 820.

Figure 13:
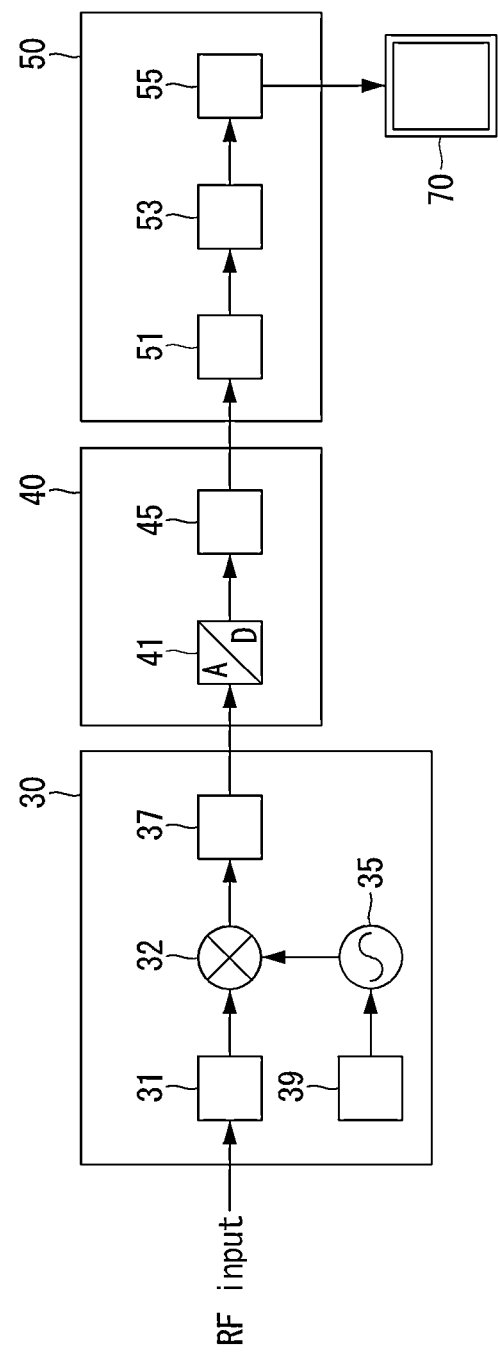
FIG. 13 is a block diagram illustrating a spectrum analyzer of a comparative example.

Each of the first RF down conversion part 710 and the second RF down conversion part 810 may include a pre-selector, a local oscillator, a mixer, and a filter (see reference numeral 30 of FIG. 13). The first or second RF down conversion part may further include a sweep generator connected to the local oscillator. The sweep generator may automatically change a frequency of a particular waveform of the local oscillator over time.

Each of the first digital processing part 720 and the second digital processing part 820 may convert an analog signal, which is the intermediate frequency signal generated by each RF down conversion part, into a digital signal, convert the converted digital signal into a baseband digital signal, and generate a baseband complex number signal by reducing a data sampling rate of the baseband digital signal. The baseband complex number signal may be referred to as complex number data.

The spectrum processing part 600 may include a cross-correlation waveform generator 300, a waveform pixel mapping unit 400, and a WMI memory 500.

The cross-correlation waveform generator 300 may include a cross-correlation spectrum processing part 100 and a waveform combiner 200.

The cross-correlation spectrum processing part 100 generates a cross-correlation spectrum using a correlation between two RF receiving channels. The cross-correlation spectrum processing part 100 performs a fast Fourier transform (FFT) on I-data and Q-data in a time domain through the correlation between the two RF receiving channels, and then accumulates each frequency component over time. In addition, the cross-correlation spectrum processing part 100 may average each frequency bin of the accumulated data of the two RF receiving channels to maintain a signal component and to reduce a noise component, thereby improving a signal-to-noise ratio and reducing a load of the spectrum processing part 600.

The waveform combiner 200 may generate an output spectrum by combining a current waveform and a previous waveform (e.g., a waveform immediately preceding the current waveform) of the cross-correlation spectrum using weight values. In other words, when an instantaneous cross-correlation spectrum is input, the waveform combiner 200 may combine the current and previous waveforms of the cross-correlation spectrum using the weight values as shown in the following Equation 2 to generate the output spectrum having a persistent function. This is to obtain a spectrum persistent effect and may be implemented in the form of connecting the waveform combiner 200 to an output terminal of the cross-correlation spectrum processing part 100.

$$O[n]=w1 \times I[n]+w2 \times O[n-1]$$ [Equation 2]

In Equation 2, O[n] denotes an output spectrum at time=n, I[n] denotes an input spectrum at time=n, O[n−1] denotes an output spectrum at time=n−1 which is a previous time immediately before the time=n, and w1 and w2 denote weighting factors, respectively. w1 and w2 may each have a real number value selected from the range of 0 to 1.

The waveform pixel mapping unit 400 maps an output spectrum waveform to the WMI memory 500 which is a display window. In a pixel memory buffer of the WMI memory 500, an x-axis may be mapped to correspond to a frequency of the output spectrum, and a y-axis may be mapped to correspond to a power level of the output spectrum.

Under the control of a processor or a controller which controls the operation of the weak signal detection device, the WMI memory 500 may store a cumulative spectrum in a color which is allocated differently according to the number of accumulations of each pixel of the pixel memory buffer with respect to an output spectrum waveform output in a specific frequency band which is an analyzed target. The cumulative spectrum is transmitted to the display device 1000 as digital level data corresponding to frame data and may be used to display a weak signal appearing intermittently on the screen of the display device in a specific color.

In this way, the weak signal detection device represents the digital level data of the cumulative spectrum in a lighter blue color as the number of accumulations decreases and in and a darker red color as the number of accumulations increases. Thus, the weak signal detection device may effectively detect an intermittent weak signal appearing intermittently as a low-level weak signal near a noise level (noise floor). In addition, the weak signal detection device may effectively detect a low-level signal within a high-level broadband signal.

In addition, in order to detect a signal generated intermittently, the weak signal detection device continuously overwrites level information in the frame with a new frame until the measurement is stopped using an overwrite mode of a decay process to display all levels appearing during a measurement time at a corresponding frequency.

In other words, the decay process includes a persistent mode and the overwrite mode, similar to a current mode and a maxhold mode of the spectrum display method. In the present embodiment, in order to observe only a current signal, the persistent mode of the decay process may be used to reduce the level information in the frame and to continuously overwrite new frames to display all levels of all frequencies of the RF signal currently appearing at a corresponding frequency in different colors on the display window. Thus, the weak signal appearing intermittently can be effectively detected.

Figure 10:
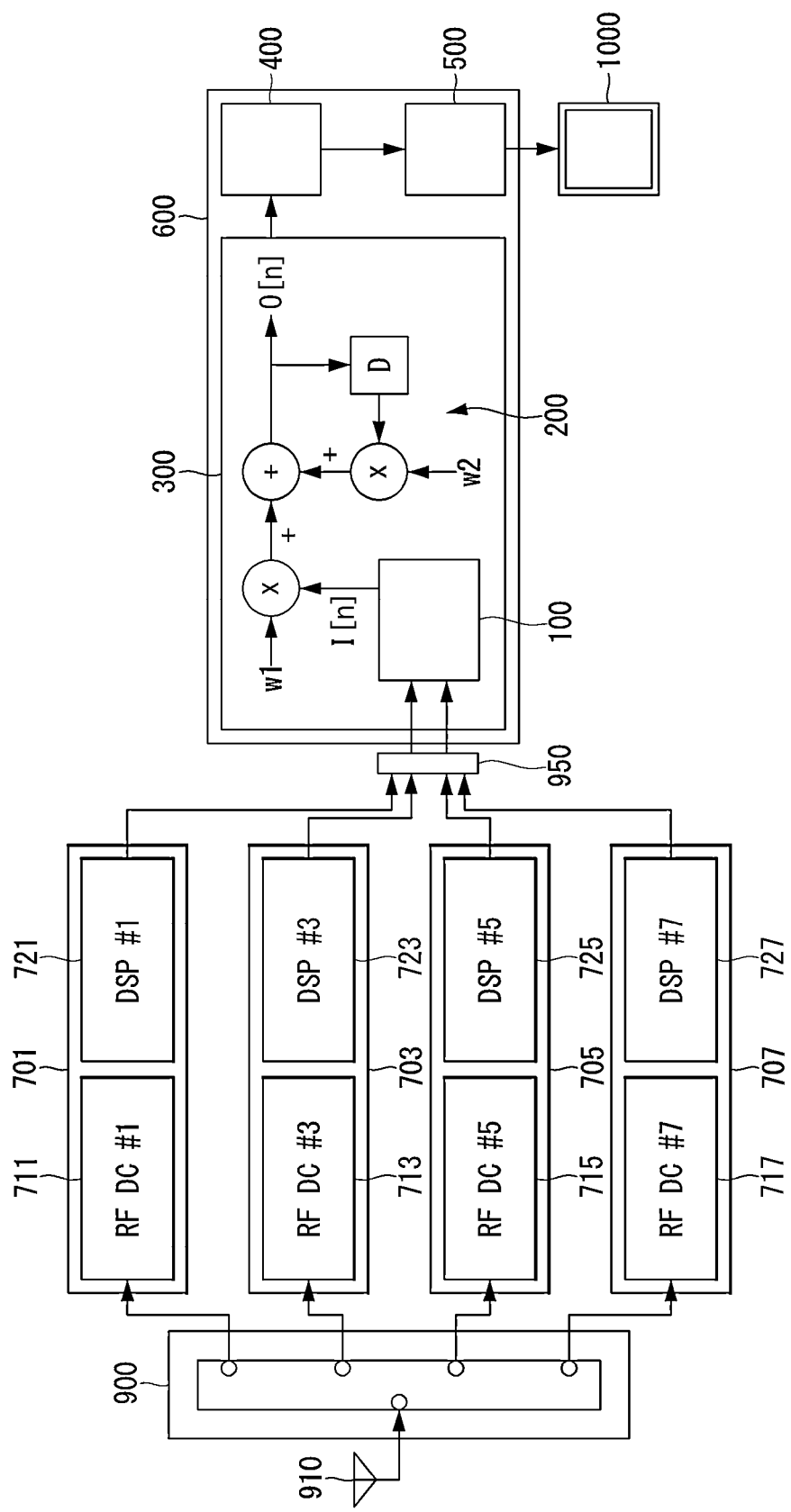
FIG. 10 is a block diagram illustrating a weak signal detection device according to a fifth embodiment of the present invention.

FIG. 10 is a block diagram illustrating a weak signal detection device according to a fifth embodiment of the present invention.

Referring to FIG. 10, the weak signal detection device may include an antenna 910, a power distributor 900, a first RF receiving channel 701, a second RF receiving channel 703, a third RF receiving channel 705, a fourth RF receiving channel 707, a spectrum processing part 600, and a channel selector 950.

The power distributor 900 may distribute an RF input from the antenna 910 and supply the distributed RF signals to the four RF receiving channels 701, 703, 705, and 707.

The four RF receiving channels 701, 703, 705, and 707 may each convert an RF signal input from the antenna 910 into an intermediate frequency signal which is able to undergo digital signal processing and convert the intermediate frequency signal into a baseband complex number signal.

The first RF receiving channel 701 may include a first RF down conversion part RF DC #1 711 and a first digital processing part DSP #1 721. The second RF receiving channel 703 may include a second RF down conversion part RF DC #2 713 and a second digital processing part DSP #2 723. The third RF receiving channel 705 may include a third RF down conversion part RF DC #3 715 and a third digital processing part DSP #3 725. In addition, the fourth RF receiving channel 707 may include a fourth RF down conversion part RF DC #4 717 and a fourth digital processing part DSP #4 727.

When the received signal of the antenna 910 is distributed by the power distributor 900 and is input to one or more of the first RF receiving channel 701 to the fourth RF receiving channel 707, the weak signal detection device of the present embodiment may control an operation of the channel selector 950 by a controller which calculates a cross-correlation value to select two receiving channels among the four receiving channels.

Figure 11:
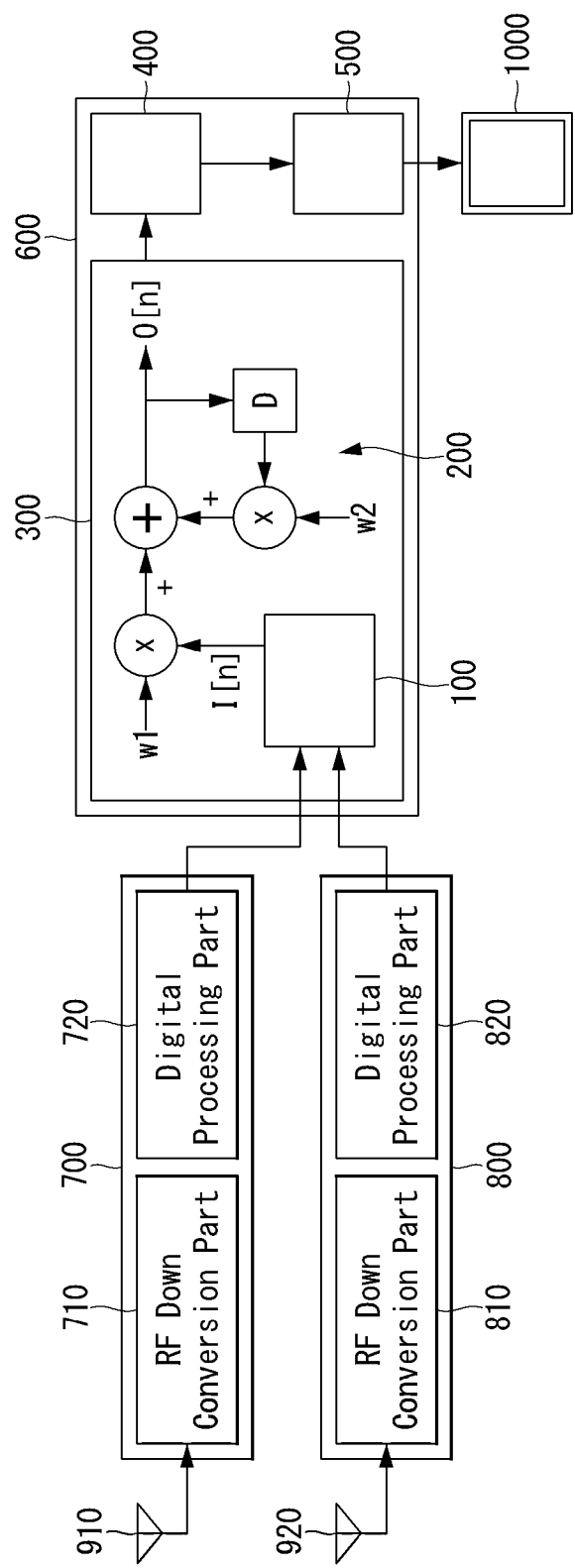
FIG. 11 is a block diagram illustrating a weak signal detection device according to a sixth embodiment of the present invention.

FIG. 11 is a block diagram illustrating a weak signal detection device according to a sixth embodiment of the present invention.

Referring to FIG. 11, the weak signal detection device may include a first antenna 910, a second antenna 920, a first RF receiving channel 700, a second RF receiving channel 800, and a spectrum processing part 600.

The weak signal detection device of the present embodiment has substantially the same configuration as the weak signal detection device of the embodiment described above with reference to FIG. 9, except for a configuration in which a received signal of the first antenna 910 is input to the first RF receiving channel 700 and a received signal of the second antenna 920 is input to the second RF receiving channel 800.

That is, the weak signal detection device of the present embodiment is substantially the same as the weak signal detection device described above with reference to FIG. 9, except for a configuration in which a power distributor is not used, and thus a detailed description thereof will be omitted.

The weak signal detection device of the present embodiment may be connected to a computing device for controlling an operation of the weak signal detection device. The computing device may be equipped with a controller or at least one processor. The control device may control an operation of a display device 1000 in order to display an intermittent weak signal in colors that are distinguishable over time.

According to the above-described embodiments, RF inputs received through a single antenna or two antennas are converted into complex digital data through two receiving channels, the complex digital data undergoes the cross-correlation signal processing to generate a cross-spectrum, current and previous waveforms of the cross-correlation spectrum are combined using weight values to generate an output spectrum having a spectrum persistent function, and a data frame is generated at each refresh time of the display device while the output spectrum waveforms are accumulated and stored in the pixel memory buffer. Thus, an image signal frame may be transmitted to the display device of the digital RF device including the spectrum analyzer at a display refresh rate so that a power level-based history of accumulated digital level data collected by a raster image memory buffer may be provided.

According to the above configuration, many cross-correlation spectrum waveforms collected over the frequency span of the signal to be analyzed are accumulated and stored in a single raster image buffer at a high speed, and waveforms of the accumulated cross-correlation spectra (cumulative spectra) are transmitted to the display device at the frame refresh rate. Thus, it is possible to effectively detect a weak signal that could not be observed and appear intermittently with a level that is less than or equal to the internal noise level of the RF receiving part.

Figure 12:
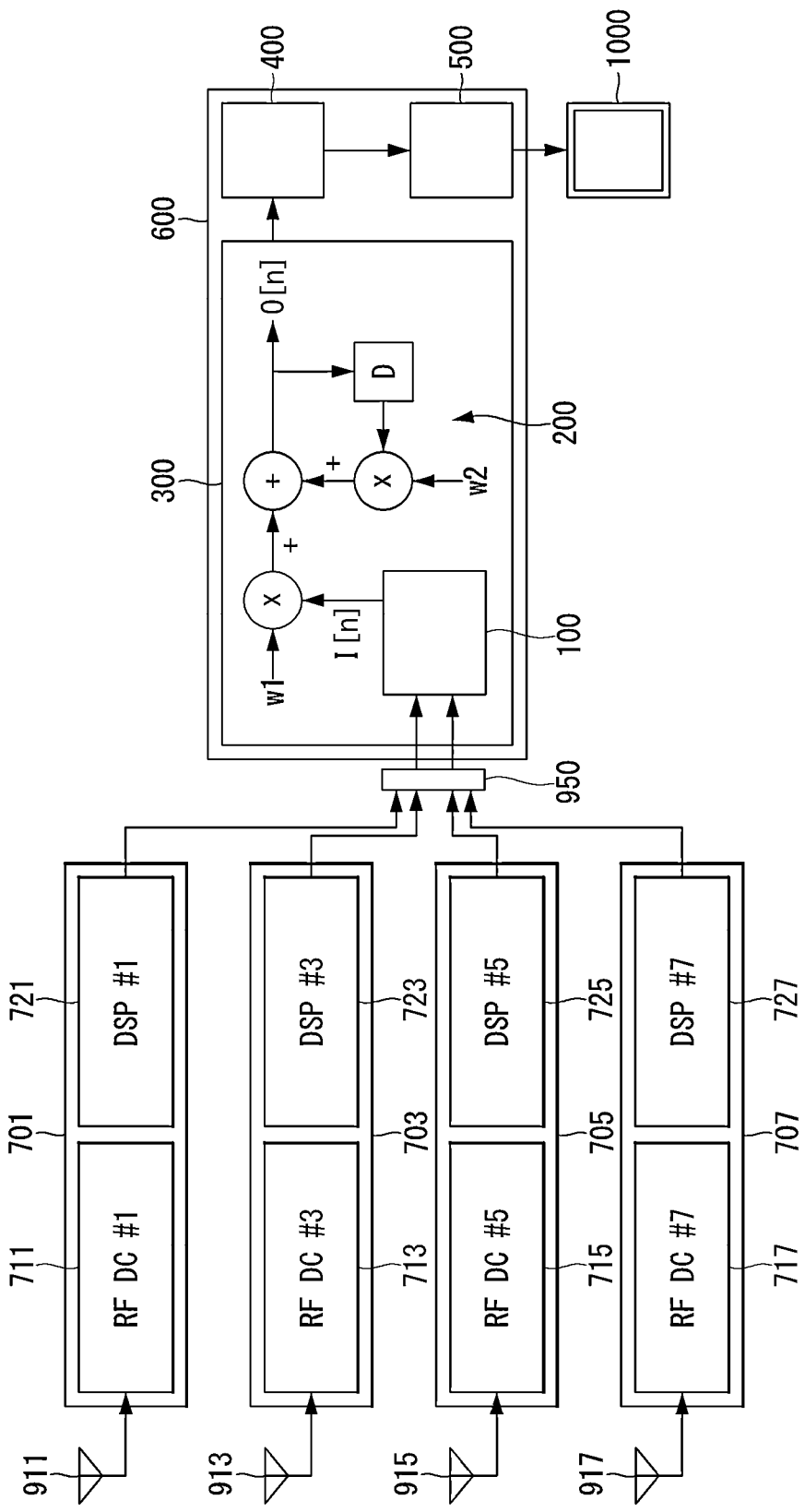
FIG. 12 is a block diagram illustrating a weak signal detection device according to a seventh embodiment of the present invention.

FIG. 12 is a block diagram illustrating a weak signal detection device according to a seventh embodiment of the present invention.

Referring to FIG. 12, the weak signal detection device may include a first antenna 911, a second antenna 913, a third antenna 915, a fourth antenna 917, a first RF receiving channel 701, a second RF receiving channel 703, a third RF receiving channel 705, a fourth RF receiving channel 707, a spectrum processing part 600, and a channel selector 950

The first RF receiving channel 701 may include a first RF down conversion part RF DC #1 711 and a first digital processing part DSP #1 721. The second RF receiving channel 703 may include a second RF down conversion part RF DC #2 713 and a second digital processing part DSP #2 723. The third RF receiving channel 705 may include a third RF down conversion part RF DC #3 715 and a third digital processing part DSP #3 725. In addition, the fourth RF receiving channel 707 may include a fourth RF down conversion part RF DC #4 717 and a fourth digital processing part DSP #4 727.

The weak signal detection device of the present embodiment may have substantially the same configuration as the weak signal detection device of the embodiment described above with reference to FIG. 11, except for a configuration in which a received signal of the first antenna 911 is input to the first RF receiving channel 701, a received signal of the second antenna 913 is input to the second RF receiving channel 703, a received signal of the third antenna 915 is input to the third RF receiving channel 705, a received signal of the fourth antenna 917 is input to the fourth RF receiving channel 707, and the channel selector 950 selects two RF receiving channels among the four RF receiving channels under the control of a controller which calculates a cross-correlation value.

In addition, in order to obtain a diversity effect, the weak signal detection device may be connected to multiple antennas and four or more RF receiving channels connected to the multiple antennas. In this case, a cross-correlation processing part 100 may perform cross-correlation signal processing on complex number signals of two RF receiving channels selected in a predetermined order or selected randomly among the four or more RF receiving channels, perform the cross-correlation signal processing on complex number data of all the RF receiving channels or a combination pair thereof, and select two RF receiving channels having relatively high performance or efficiency with respect to noise reduction on the basis of the cross-correlation values of all the RF receiving channels or the combination pair thereof.

In addition, the weak signal detection device generates a cross-correlation spectrum by the cross-correlation processing part 100 using a correlation between the two RF receiving channels selected by a controller, combines current and previous waveforms of the cross-correlation spectrum by a waveform combiner 200 using weight values to generate an output spectrum having a spectrum persistent function, accumulates and stores an output spectrum mapped by a waveform pixel mapping unit 400 in a WMI memory 500, and transmits the output spectrum to a the display device at a frame refresh timing, thereby allowing the user to intuitively detect an intermittent weak signal on the screen of the display device.

FIG. 13 is a block diagram illustrating a spectrum analyzer of a comparative example.

Referring to FIG. 13, the spectrum analyzer of the comparative example includes an antenna, an RF conversion part 30, a digital signal processing part 40, and a spectrum processing part 50. A display device 70 is connected to the spectrum processing part 50.

The RF conversion part 30 includes a pre-selector 31, a mixer 33, a local oscillator 35, a filter 37, and a sweep generator 39. The digital signal processing part 40 includes an analog-to-digital converter 41 and a digital down converter 43. In addition, the spectrum processing part 50 includes a detector 51, a complex waveform generator 53, and a WMI memory 55.

To describe an operating process of the spectrum analyzer of the comparative example, when an RF signal received by the antenna in the air is input, the RF conversion part 30 converts the RF signal into an intermediate frequency signal which is able to undergo digital signal processing. Next, the digital signal processing part 40 converts an analog signal into a digital signal using the analog-to-digital converter 41 and converts the digital signal into a baseband signal with a reduced data sampling rate using the digital down converter 43.

Then, the spectrum processing part 50 processes the input digital signal and displays the processed input digital signal on a screen of the display device in real time. The detector 51 of the spectrum processing part 50 calculates a power level of complex digital data at a frequency set by the spectrum analyzer.

According to the comparative example, although it is possible to detect a normal signal appearing intermittently by accumulating and displaying the complex digital data through application of the cumulative spectrum to process real-time large-capacity data, it is impossible to detect a weak signal appearing intermittently. In addition, although it is possible to improve a signal-to-noise ratio on a spectrum by removing random noise components through a cross-spectrum, it is difficult to detect a signal appearing intermittently through the configuration of the comparative example.

Figure 14:
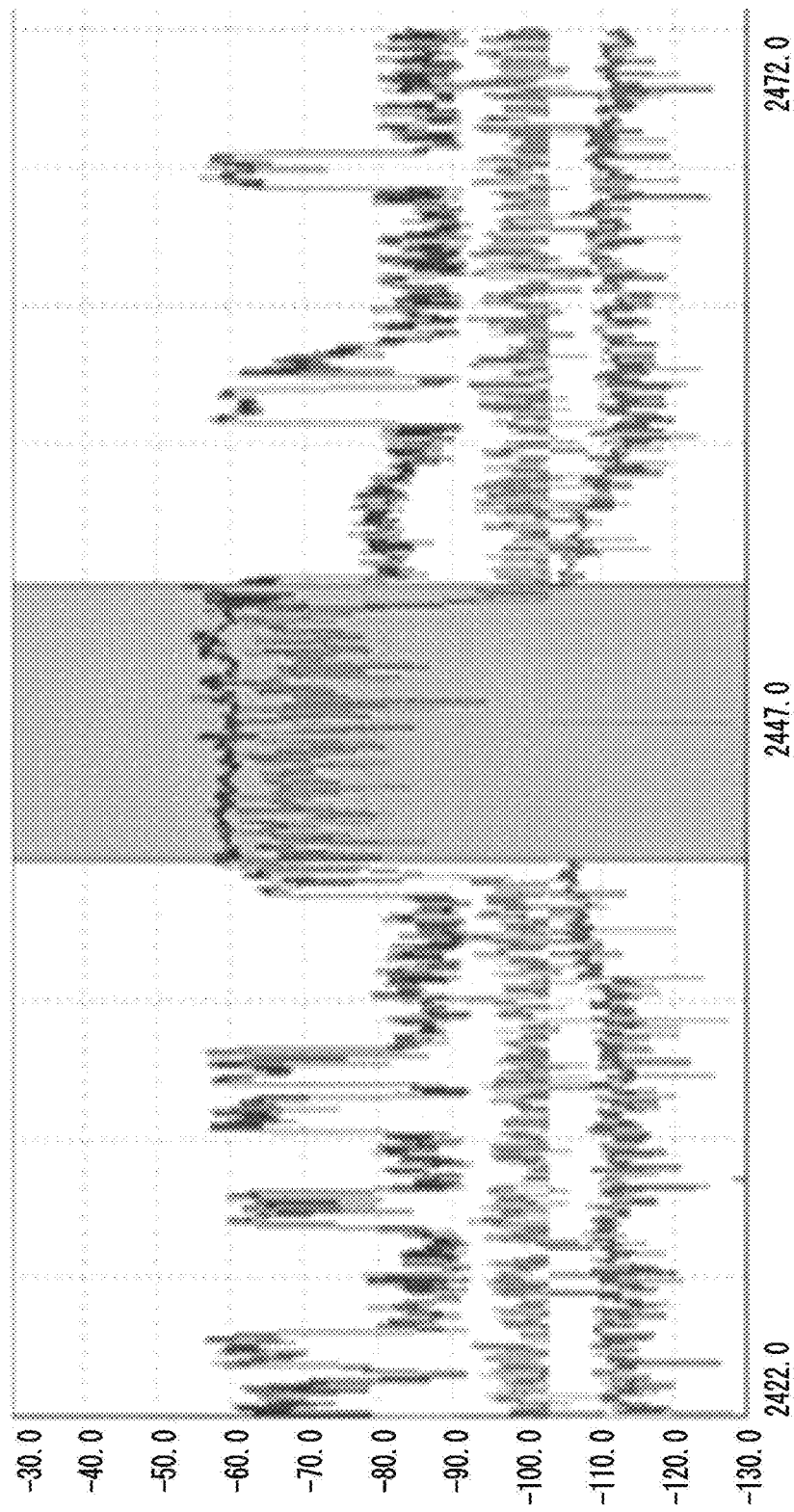
FIG. 14 is an exemplary diagram illustrating a waveform of frequency versus level, that is, a cross-spectrum, of the spectrum analyzer of the comparative example.
Figure 15:
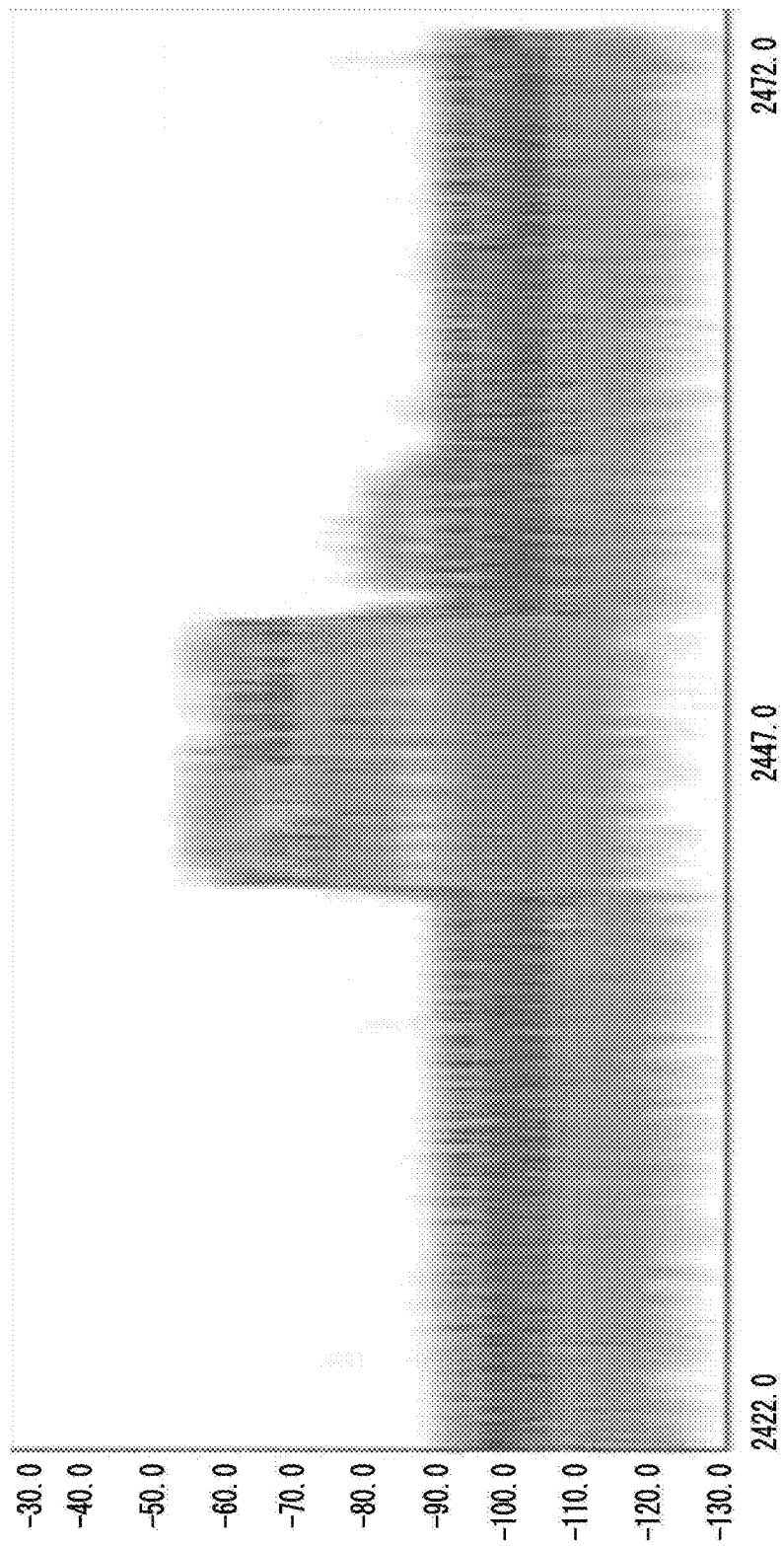
FIG. 15 is a diagram illustrating waveforms of frequency versus level expressed in different colors according to an appearance frequency in the spectrum analyzer of the comparative example.
Figure 16:
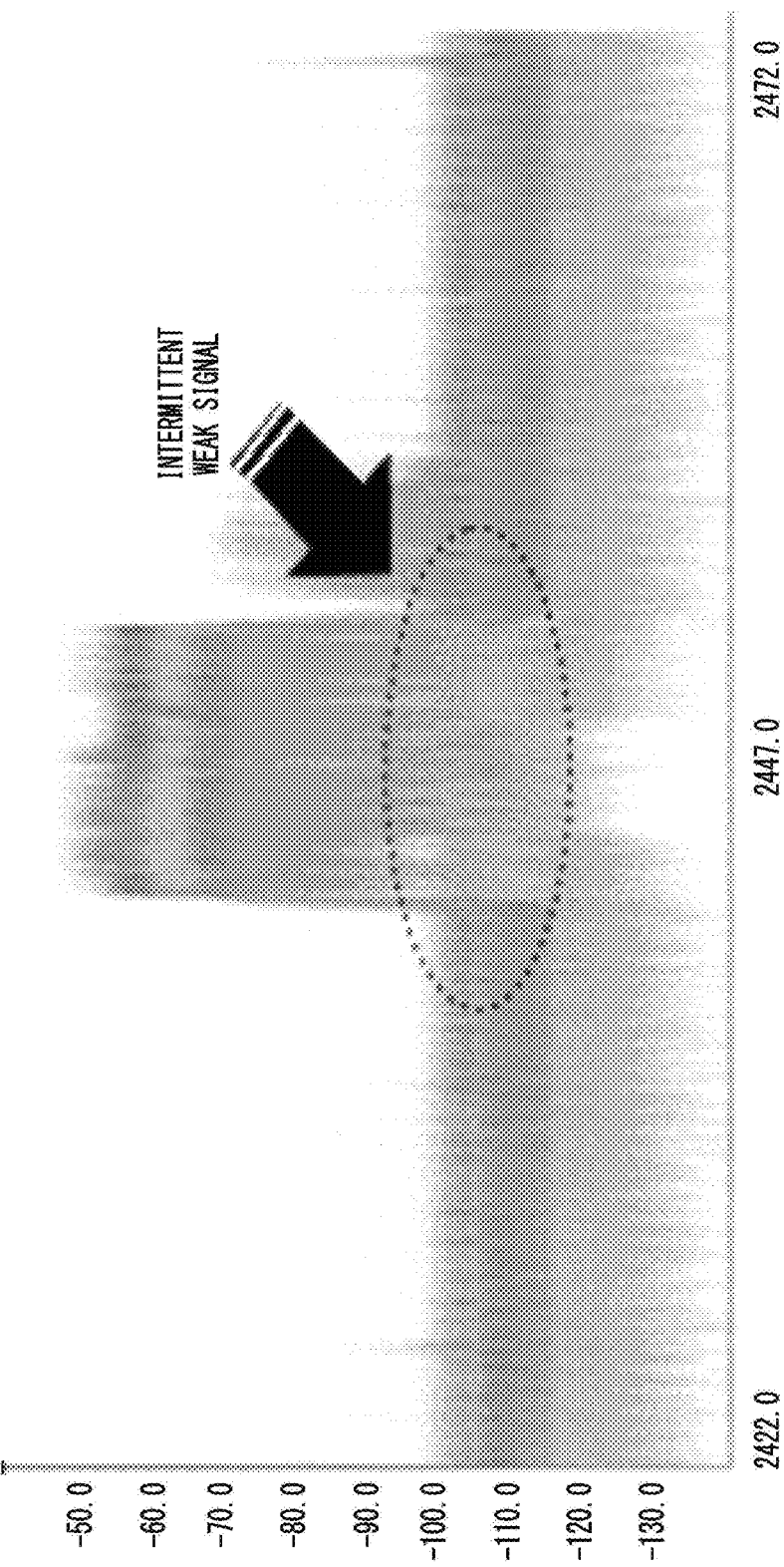
FIG. 16 is a diagram illustrating waveforms of frequency versus level expressed in different colors according to an appearance frequency in the weak signal detection device of the present embodiment.

FIG. 14 is an exemplary diagram illustrating a waveform of frequency versus level, that is, a cross-spectrum, of the spectrum analyzer of the comparative example. FIG. 15 is a diagram illustrating waveforms of frequency versus level expressed in different colors according to an appearance frequency in the spectrum analyzer of the comparative example. FIG. 16 is a diagram illustrating waveforms of frequency versus level expressed in different colors according to an appearance frequency in the weak signal detection device of the present embodiment (corresponding to the spectrum analyzer).

Waveforms of the cross-correlation spectrum obtained from the spectrum analyzer of the comparative example (see FIG. 13) may be output on the display window as shown in FIG. 14, or waveforms in which general spectra are accumulated may be output on the display window as shown in FIG. 15. However, the spectrum analyzer of the comparative example cannot detect a weak signal appearing intermittently through the cumulative spectrum.

Meanwhile, as shown in FIG. 16, when the weak signal detection device of the present embodiment accumulates a cross-correlation spectrum through a spectrum persistent function and outputs the cumulative spectrum as frequency versus power level on the display window, it is possible to clearly detect and display a low-level signal which appears intermittently but that is invisible in the comparative examples of FIGS. 14 and 15, that is, which has a level that is less than or equal to the internal noise level of the RF receiving part. That is, according to the present embodiment, a high-level signal and a low-level signal including an intermittent weak signal may be clearly separated and displayed.

Figure 17:
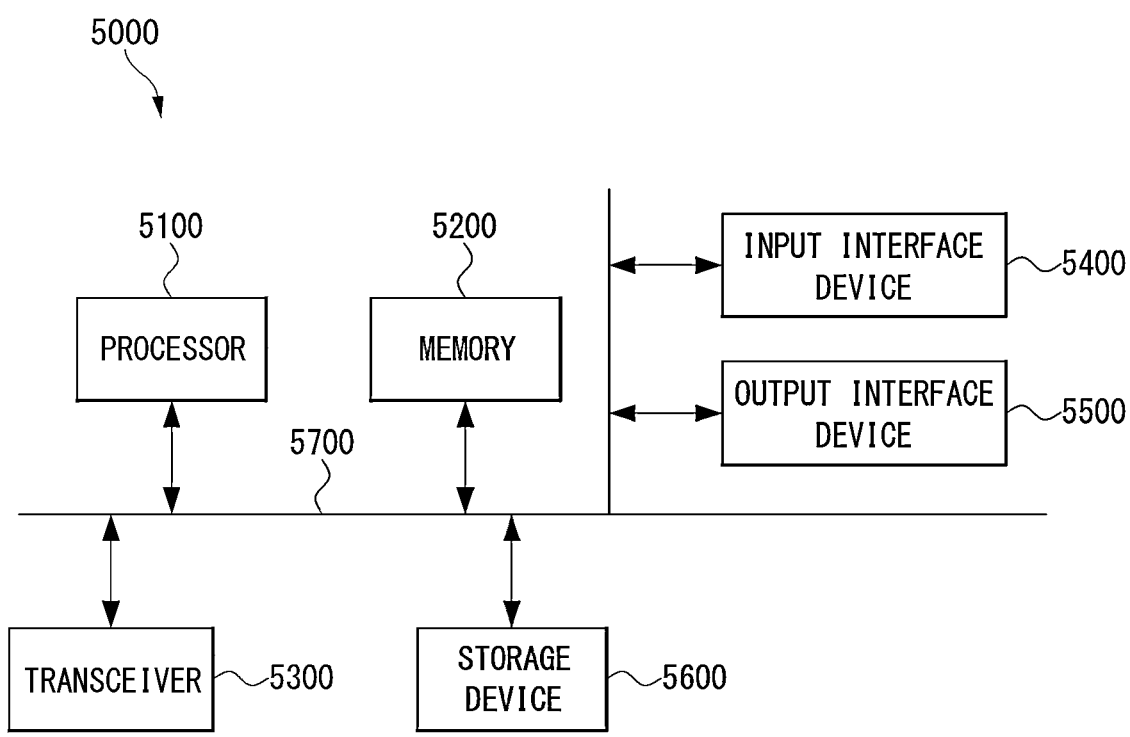
FIG. 17 is a schematic block diagram illustrating a configuration applicable to a weak signal detection device according to an eighth embodiment of the present invention.

FIG. 17 is a schematic block diagram illustrating a configuration applicable to a weak signal detection device according to an eighth embodiment of the present invention.

Referring to FIG. 17, in addition to any one of the weak signal detection devices of the embodiments described above with reference to FIGS. 1, 5, and 9 to 12, a weak signal detection device 5000 further includes a processor 5100. The processor 5100 may serve as the controller described in the present specification.

In addition, the weak signal detection device 5000 may selectively further include a memory 5200, a transceiver 5300, an input interface device 5400, an output interface device 5500, a storage device 5600, or a combination thereof.

The components included in the weak signal detection device 5000 may be connected through a bus 5700 to communicate with each other or may be connected through individual interfaces or individual buses based on at least one processor 5100. For example, the processor 5100 may be connected to at least one among the memory 5200, the transceiver 5300, the input interface device 5400, the output interface device 5500, and the storage device 5600 through a dedicated interface.

The processor 5100 may execute a program command stored in at least one of the memory 5200 and the storage device 5600. The processor 5100 may function to control operations of a cross-correlation processing part, a waveform combiner, a waveform pixel mapping unit, a waveform map image memory, a channel selector, and the like, which are equipped to detect an intermittent weak signal, based on at least one command or program command. The processor 5100 may be a central processing unit (CPU), a graphics processing unit (GPU), or a dedicated processor in which methods according to embodiments of the present invention are performed.

Each of the memory 5200 and the storage device 5600 may be constituted of at least one of a volatile storage medium and a nonvolatile storage medium. For example, the memory 5200 may be formed as at least one of a read only memory (ROM) and a random access memory (RAM).

The weak signal detection device of the above-described embodiments may be implemented as at least some components or functional units of the digital RF device, the spectrum analyzer, or the weak signal monitoring device.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A weak signal detection device for detecting a weak signal appearing intermittently with a level that is less than or equal to internal noise of a radio frequency (RF) receiving part, the weak signal detection device comprising:
    a cross-correlation spectrum processing part configured to generate a cross-correlation spectrum using a correlation between RF receiving channels; and
    a waveform combiner configured to generate an output spectrum having a spectrum persistent function by assigning weight values to a current waveform and a previous waveform of the cross-correlation spectrum.

2. The weak signal detection device of claim 1, wherein the waveform combiner generates the output spectrum by multiplying a cross-correlation spectrum at an $n^{th}$ time, which is the current waveform, by a first weight value (w1), multiplying a cross-correlation spectrum at an $(n-1)^{th}$ time, which is a waveform immediately previous to the current waveform, by a second weight value (w2), and adding the cross-correlation spectrum multiplied by the first weight value and the cross-correlation spectrum multiplied by the second weight value.

3. The weak signal detection device of claim 2, wherein the waveform combiner is provided with a waveform storage unit which stores the cross-correlation spectrum at the $(n-1)^{th}$ time.

4. The weak signal detection device of claim 1, further comprising a waveform pixel mapping unit configured to map waveforms of the output spectrum to pixels of a pixel memory buffer.

5. The weak signal detection device of claim 1, further comprising a waveform map image (WMI) memory which is provided with pixels of a pixel memory buffer and in which the waveforms of the output spectrum for a certain period of time are accumulated and stored,
wherein digital level data formed by the waveforms of the output spectrum accumulated and stored in the WMI memory is transmitted to a display device at every screen refresh time of the display device.

6. The weak signal detection device of claim 5, further comprising a controller configured to control an operation of the display device to display the digital level data in different colors on a screen of the display device according to a level of the digital level data of each pixel accumulated according to the number of times storage is performed or the number of hits of the waveforms of the cross-correlation spectrum stored in each pixel of the WMI memory.

7. The weak signal detection device of claim 1, further comprising at least two RF receiving channels connected to at least one antenna and configured to provide a complex number signal to the cross-correlation spectrum processing part.

8. The weak signal detection device of claim 7, further comprising, when the RF receiving channels are provided as three or more RF receiving channels, a channel selector disposed between the three or more RF receiving channels and the cross-correlation spectrum processing part.

9. The weak signal detection device of claim 7, wherein:
the at least one antenna includes at least two antennas; and
the at least two antennas are connected to the at least two RF receiving channels.

10. The weak signal detection device of claim 7, wherein:
the at least one antenna includes a single antenna; and
the weak signal detection device further includes a power distributor disposed between the single antenna and the at least two RF receiving channels and configured to branch a received signal of the single antenna and distribute the branched signals to the at least two RF receiving channels.

11. The weak signal detection device of claim 7, wherein:
each of the at least two RF receiving channels includes an RF down conversion part;
the RF down conversion part is provided with a sweep generator connected to a local oscillator of the RF down conversion part; and
the sweep generator operates to automatically vary an oscillation frequency of the local oscillator over time.

12. The weak signal detection device of claim 7, wherein:
each of the at least two RF receiving channels includes a digital processing part; and the digital processing part converts an analog signal of an intermediate frequency input from the RF down conversion part into a digital signal, converts the converted digital signal into a baseband signal, and reduces a data sampling rate of the baseband signal to generate complex number data input to the cross-correlation spectrum processing part.

13. A method of detecting a weak signal appearing intermittently with a level that is less than or equal to an internal noise of a radio frequency (RF) receiving part, the method comprising:
generating a cross-correlation spectrum using a correlation between RF receiving channels; and
generating an output spectrum having a spectrum persistent function by assigning weight values to a current waveform and a previous waveform of the cross-correlation spectrum.

14. The method of claim 13, wherein the generating of the output spectrum includes generating the output spectrum by multiplying a cross-correlation spectrum at an $n^{th}$ time, which is the current waveform, by a first weight value, multiplying a cross-correlation spectrum at an $(n-1)^{th}$ time, which is a waveform immediately previous to the current waveform, by a second weight value, and adding the cross-correlation spectrum multiplied by the first weight value and the cross-correlation spectrum multiplied by the second weight value.

15. The method of claim 14, further comprising storing a cross-correlation spectrum at the $(n-1)^{th}$ time.

16. The method of claim 13, further comprising mapping waveforms of the output spectrum to pixels of a waveform map image (WMI) memory.

17. The method of claim 16, further comprising accumulating and storing the waveforms of the output spectrum in the WMI memory for a certain period of time.

18. The method of claim 17, further comprising transmitting digital level data, which is formed by the waveforms of the output spectrum accumulated and stored in the WMI memory, to a display device at every screen refresh time of the display device.

19. The method of claim 18, further comprising controlling an operation of the display device to display the digital level data in different colors on a screen of the display device according to a level of the digital level data of each pixel accumulated according to the number of times storage is performed or the number of hits of the waveforms of the cross-correlation spectrum stored in each pixel of the WMI memory.

20. The method of claim 13, further comprising providing a complex number signal to a cross-correlation spectrum processing part through at least two RF receiving channels connected to at least one antenna.

21. The method of claim 20, further comprising, when the RF receiving channels are provided as three or more RF receiving channels, selecting two channels between the three or more RF receiving channels and the cross-correlation spectrum processing part on the basis of a cross-correlation value.

22. The method of claim 20, wherein:
the at least one antenna includes a single antenna; and
the method further includes branching a received signal of the single antenna and distributing the branched signals to the at least two RF receiving channels through a power distributor disposed between the single antenna and the at least two RF receiving channels.

23. The method of claim 20, further comprising, when each of the at least two RF receiving channels is provided with an RF down conversion part, and the RF down conversion part is provided with a sweep generator connected to a local oscillator of the RF down conversion part, automatically varying, by the sweep generator, an oscillation frequency of the local oscillator over time.

24. The method of claim 23, further comprising, when each of the at least two RF receiving channels further includes a digital processing part,
- converting, by the digital processing part, an analog signal of an intermediate frequency entered from the RF down conversion part into a digital signal;
- converting the converted digital signal into a baseband signal,
- reducing a data sampling rate of the baseband signal to generate complex number data, and
- providing the generated complex number data to the cross-correlation spectrum processing part.

* * * * *